(12) United States Patent
Tamilarasan et al.

(10) Patent No.: US 12,399,645 B2
(45) Date of Patent: Aug. 26, 2025

(54) I/O PROCESSING TECHNIQUES IN A MULTI-NODE SYSTEM

(71) Applicant: Dell Products L.P., Hopkinton, MA (US)

(72) Inventors: Ashok Tamilarasan, Shrewsbury, MA (US); Vamsi K. Vankamamidi, Hopkinton, MA (US); Vikram A. Prabhakar, Apex, NC (US)

(73) Assignee: Dell Products L.P., Hopkinton, MA (US)

( * ) Notice: Subject to any disclaimer, the term of this patent is extended or adjusted under 35 U.S.C. 154(b) by 72 days.

(21) Appl. No.: 18/408,007

(22) Filed: Jan. 9, 2024

(65) Prior Publication Data

US 2025/0224898 A1   Jul. 10, 2025

(51) Int. Cl.
*G06F 3/06* (2006.01)

(52) U.S. Cl.
CPC .......... *G06F 3/0655* (2013.01); *G06F 3/061* (2013.01); *G06F 3/0679* (2013.01)

(58) Field of Classification Search
CPC ... H04L 47/10; H04L 67/563; H04L 67/1097; G06F 3/067; G06F 3/0635; G06F 3/0655; G06F 3/061; G06F 3/0679; G06F 11/2005; G06F 11/2071; G06F 11/2064; G06F 11/2097; G06F 16/182; G06F 2206/1012

See application file for complete search history.

(56) References Cited

U.S. PATENT DOCUMENTS 8,683,260 B1 * 3/2014 Zhang ................ G06F 11/1092
714/13

2015/0261633 A1 * 9/2015 Usgaonkar .......... H04L 67/1097
714/6.3
2022/0206871 A1 * 6/2022 Armangau ............ G06F 9/5027
2024/0146803 A1 * 5/2024 Xu ....................... H04L 47/2416
2025/0124004 A1 * 4/2025 Jernigan, IV ......... G06F 3/0614

OTHER PUBLICATIONS

Ashok Tamilarasan, et al., U.S. Appl. No. 18/118,946, filed Mar. 8, 2023, entitled Caching Techniques Using a Mapping Cache and Maintaining Cache Coherency Using Hash Values.

Ashok Tamilarasan, et al., U.S. Appl. No. 18/119,565, filed Mar. 9, 2023, entitled Caching Techniques Using a Mapping Cache and Maintaining Cache Coherency Using Physical to Logical Address Mapping.

* cited by examiner

*Primary Examiner* — Curtis James Kortman
(74) *Attorney, Agent, or Firm* — BainwoodHuang

(57) ABSTRACT

Techniques can include: receiving, at a first node, a read I/O directed to a logical address; determining that the first node does not own the logical address; sending over an interconnect a redirect request from the first node to a second node that owns the first logical address; and the second node performing processing including: determining, in accordance with one or more criteria, whether the interconnect is overloaded; responsive to determining that the interconnect is not overloaded, sending a redirect reply over the interconnect to the first node where the redirect reply includes first content stored at the first logical address; and responsive to determining that the interconnect is overloaded, sending the redirect reply over the interconnect to the first node where the redirect reply includes physical location information identifying a first physical storage location or address on non-volatile storage of the first content of the first logical address.

20 Claims, 17 Drawing Sheets

I/O PROCESSING TECHNIQUES IN A MULTI-NODE SYSTEM

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving, at a first node of a storage system from a host, a read I/O directed to a first logical address; determining that the first node does not own the first logical address; responsive to determining that the first node does not own the first logical address, sending a redirect request from the first node to a second node of the storage system, wherein the second node owns the first logical address, wherein the redirect request is sent over an interconnect between the first node and the second node; and responsive to receiving the redirect request at the second node, the second node performing first processing including: determining, in accordance with one or more criteria, whether the interconnect is overloaded; responsive to determining, in accordance with the one or more criteria, that the interconnect is not overloaded, sending a redirect reply over the interconnect from the second node to the first node where the redirect reply includes first content stored at the first logical address; and responsive to determining, in accordance with the one or more criteria, that the interconnect is overloaded, sending the redirect reply over the interconnect from the second node to the first node where the redirect reply includes physical location information identifying a first physical storage location or address on non-volatile storage of the first content of the first logical address.

In at least one embodiment, the interconnect can be determined, in accordance with the one or more criteria, to be overloaded, and wherein the method can include: receiving, at the first node the redirect reply from the second node, where the redirect reply includes the physical location information of the first content; obtaining the first content from the first physical storage location on non-volatile storage, wherein the first physical storage location is identified by the physical location information of the redirect reply; and returning the first content obtained to the host in response to the read I/O. The interconnect can be determined, in accordance with the one or more criteria, not to be overloaded, and wherein the method can include: receiving, at the first node the redirect reply from the second node, where the redirect reply includes the first content; and returning the first content obtained from the redirect reply to the host in response to the read I/O.

In at least one embodiment, the first processing can include: determining whether the first content of the first logical address is stored in a cache of the second node; responsive to determining the first content is not stored in the cache of the second node, determining whether a mapping cache of the second node includes a corresponding descriptor of information about the first logical address; and responsive to determining that the mapping cache does not include the corresponding descriptor of information about the first logical address, performing second processing comprising: using mapping information including a plurality of metadata (MD) pages to map the first logical address to the first physical storage location on non-volatile storage where the first content is stored; and obtaining the first content from the first physical storage location on non-volatile storage. The second processing can include: promoting the first content to the cache of the second node wherein the first content is accessed in the cache using the first logical address; and promoting the first physical storage location to the mapping cache of the second node, wherein said promoting the first physical storage location includes adding a descriptor to the mapping cache, wherein the first logical address is mapped to the descriptor, wherein the descriptor includes the physical location information identifying the first physical storage location on non-volatile storage. The interconnect can be determined to be overloaded, and wherein the redirect reply can include the physical location information obtained as a result of performing said second processing using said mapping information. The interconnect can determined not to be overloaded, and wherein the redirect reply can include the first content obtained as a result of performing the second processing using the mapping information.

In at least one embodiment, the one or more criteria can includes a condition that specifies if a current utilization of the interconnect between the nodes is greater than a specified utilization threshold, other information including the physical location information of the first content is returned in the redirection reply rather than the first content, and otherwise the first content is allowed to be returned in the redirect reply. The one or more criteria includes a condition that specifies if current consumed bandwidth of the interconnect is greater than a specified threshold or percentage of a maximum supported or capable bandwidth of the interconnect, other information including the physical location information of the first content is returned in the redirection reply rather than the first content, and otherwise the first content is allowed to be returned in the redirect reply. The one or more criteria includes a condition that specifies if a total number of outstanding or pending I/O requests in the storage system exceeds a specified threshold, other information including the physical location information of the first content is returned in the redirection reply rather than the first content, and otherwise the first content is allowed to be returned in the redirect reply. The number of outstanding or pending I/O requests can denote a total number of I/O requests that have been received at the storage system but for which a response or reply has not yet been returned to a host or other storage client. The one or more criteria can include a condition that specifies if a total number of outstanding or pending I/O redirection requests in the storage system exceeds a specified threshold, other information including the physical location information of the first content is returned in the redirection reply rather than the first content, and otherwise the first content is allowed to be returned in the redirect reply. The total number of outstanding or pending I/O redirection requests can denote a total number of redirection requests for which a non-owner node has sent a redirection request to the owner node but not yet received a reply. The one or more criteria can include a condition that specifies if an average I/O latency or I/O response time within the storage system exceeds a maximum threshold, other information including the physical location information of the first content is returned in the redirection reply rather than the first content, and otherwise the first content is allowed to be returned in the redirect reply. The one or more criteria can include a condition that specifies if an average redirection request latency or response time within the storage system exceeds a maximum threshold, other information including the physical location information of the first content is returned in the redirection reply rather than the first content, and otherwise the first content is allowed to be returned in the redirect reply. The average redirection latency or response time for a single redirection request can denote the amount of time it takes from a starting point to an ending point, wherein the starting point is a first point in time when the single redirection request is sent by a non-owner node to an owner node, and wherein the ending point denotes a second point in time when the non-owner node receives a corresponding redirection reply from the owner node.

In at least one embodiment, responsive to determining, in accordance with the one or more criteria, that the interconnect is overloaded, the redirect reply sent over the interconnect from the second node to the first node can further include a cryptographic hash value of the first content of the first logical address. Processing can include: the second node reading the first content from the first physical storage location on non-volatile storage, wherein the first physical storage location is determined by the second node using the physical location information of the redirect reply; and the second node using the cryptographic hash value of the redirect reply perform data validation of the first content read from the first physical storage location, wherein performing said data validation of the first content includes: determining a second cryptographic hash value using the first content read from the physical storage location; determining whether the cryptographic hash value matches the second cryptographic hash value; and responsive to determining that the cryptographic hash value matches the second cryptographic hash value, determining that the first content, as read from the physical storage location in accordance with the physical storage information of the redirect reply, is valid.

BRIEF DESCRIPTION OF THE DRAWINGS

Features and advantages of the present disclosure will become more apparent from the following detailed description of exemplary embodiments thereof taken in conjunction with the accompanying drawings in which.

DETAILED DESCRIPTION OF EMBODIMENT(S)

Figure 1:
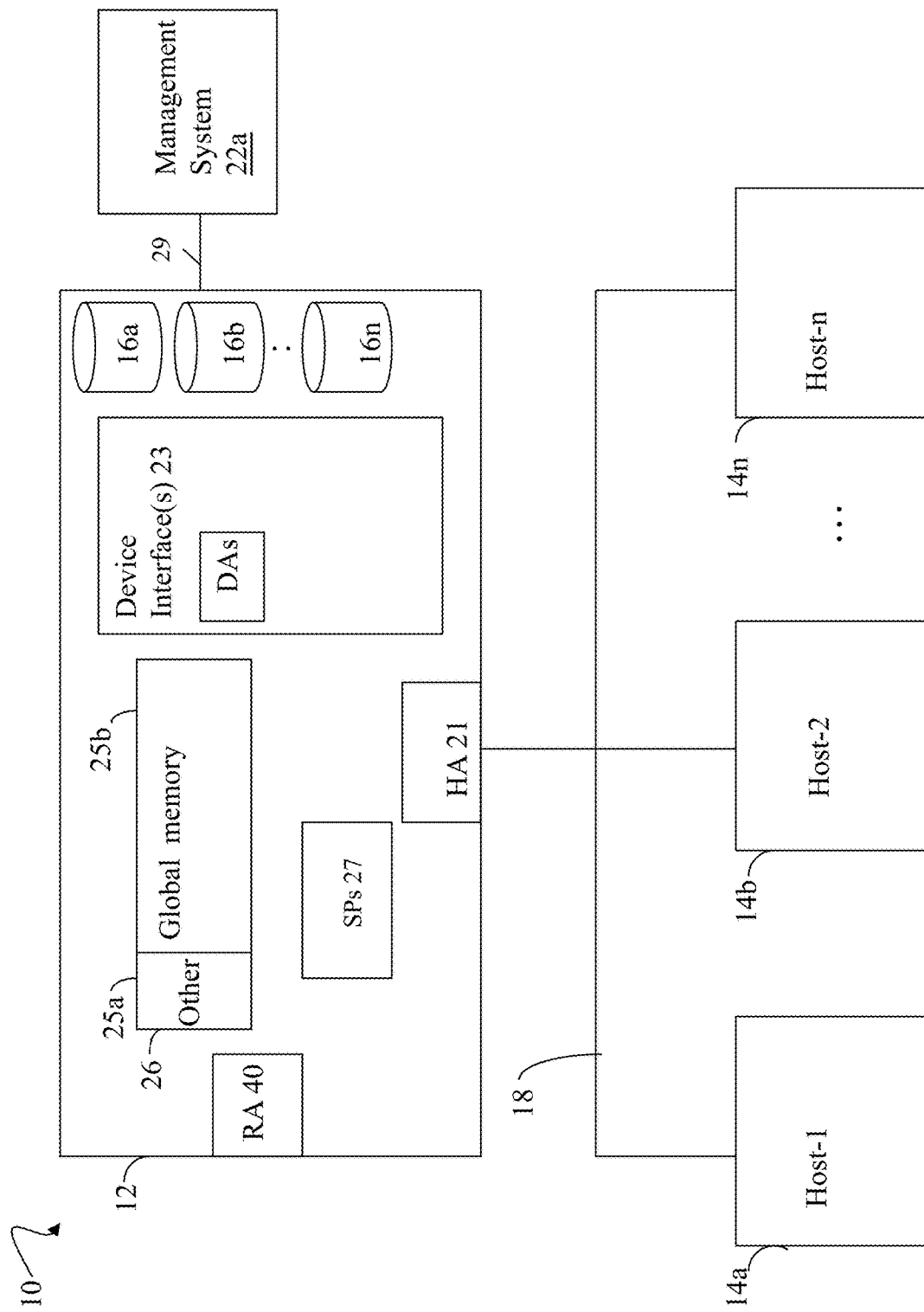
FIG. 1 is an example of components that may be included in a system in accordance with the techniques of the present disclosure.

In one dual node storage system configuration, a volume can be accessed by hosts or other storage clients from either node over paths to the respective two nodes where each path is configured as either AO (active-optimized) or ANO (active non-optimized). In one configuration for each volume, paths to a first node can be configured as AO, and paths to the remaining second node can be configured as ANO. In such an ANO-AO configuration, each volume can be owned by a single one of the nodes, where paths to that single node can be configured as AO for the owned volume and where the single node can be optimized to service I/Os directed to the volume owned by the single node. In normal operation with an AO-ANO configuration, the host can be expected to send I/Os directed to a volume to only a single one of the nodes that owns that volume where paths to the owning node are configured as AO, and where paths to the non-owning node of the volume are configured as ANO. The foregoing can make storage management more complicated, for example, where the system administrator needs to have knowledge of the I/O load on different volumes so as to balance their ownership assignment and overall load across both nodes and their respective paths. For example with an ANO-AO configuration, the system administrator can balance I/O load of volumes among the two nodes of the storage system based on volume ownership since it can be expected that host I/Os directed to each volume are only sent to the single node that owns the volume, where the paths between the host and the single owning node of the volume are configured as AO for the volume and where other paths between the host and the remaining non-owning node of the volume are configured as ANO for the volume.

As an alternative, another dual node system configuration can be used which is an AO-AO configuration. The AO-AO configuration can alleviate the above-noted complications of storage management of an ANO-AO configuration by making paths to both nodes optimized to service I/O for the volumes. With such an AO-AO or active-active configuration, a host can access volumes from both nodes, for example, by issuing I/Os to a volume to both nodes simply using a round-robin approach that sends the I/Os over paths to both nodes. However, an active-active AO-AO configuration can have its own associated drawbacks and complexities. For example, since host I/Os for a same volume are expected to be sent to, and serviced by, both nodes, metadata (MD) or other information such as mapping information discussed herein regarding the volume may be accessed by both nodes and can thus require internode locking and communication to facilitate any required synchronization between the nodes when accessing MD. Such internode locking and other operations for internode synchronization have an associated performance cost and can result in adversely affecting I/O performance and general system performance.

Described in the present disclosure are techniques that provide for efficient volume access by a host or other storage client. In at least one embodiment, the storage system can have an AO-AO or active-active configuration where the host can issue I/Os for the same volume to both nodes. In at least one embodiment of an active-active AO-AO dual node storage system, the storage system can internally maintain per volume ownership by a single one of the nodes while still allowing an external host to issue I/Os to the volume to both the owner node as well as the non-owner node independent of volume ownership by only a particular one of the nodes. In this manner, the node ownership in such an embodiment may not be exposed externally to the host or other storage client such that ownership of a volume by only a single one of the nodes can be transparent to the host. In at least one embodiment, the client can send I/Os to volumes over paths to both nodes while the storage system can internally perform processing to redirect I/Os of the volume received by a non-owning node to the owning node. This approach has the advantages of allowing the host to access volumes over paths to both nodes while also simplifying access to the volume internally by only a single owner node. Such an approach with volume ownership by a single node can reduce resource contention between the nodes and reduce synchronization and communication overhead such as with respect to at least some of the MD pages associated with volumes.

However, redirecting I/Os from a non-owner node to the owner node can place additional load on an internal storage system interconnect or interconnection between the nodes and can potentially result in the interconnection between the node being a bottleneck. In at least one embodiment, the interconnection can be an internal connection in the storage system used for internode communication and redirected I/Os can be forwarded from a non-owner node to an owner node over the interconnection. Accordingly, the techniques of the present disclosure in at least one embodiment further provide for minimizing or reducing the load on the interconnect between the nodes, where volumes are presented as active-active or AO-AO to the hosts but where the storage system maintains internal node ownership of the volume or other defined suitable storage granularity. In at least one embodiment for a read I/O of a volume where the read I/O is received by the non-owner node of the volume and where the read I/O is redirected to the peer owner node, the storage system can vary the information, and size or amount of information, returned by the owner node to the non-owner node in reply to the redirection request from the non-owner. In at least one embodiment, the information returned can be based, at least in part, on the load or utilization of the interconnection between the nodes. In at least one embodiment where the owner node can return the requested read data or otherwise return other information used to reference the requested read data, the other information can generally be smaller in size than the read data itself. In at least one embodiment, the other information can be fixed in size for any read I/O serviced and can be smaller in size than a minimum read data size or payload allowed. In at least one embodiment, the read data associated with a read I/O can have a maximum allowable size that is generally much larger than the size of the other information. In at least one embodiment, the other information can include at least physical address information that includes a reference to the read data stored at a target logical address of the read I/O. In at least one embodiment, the reference can be a pointer to, or address of, the read data as stored on a back-end (BE) non-volatile storage location mapped to the target logical address of the read I/O. In at least one embodiment, the other information of the redirection reply returned to the non-owning node in response to a redirection request can include a hash value of the read data as stored on the BE non-volatile storage. In at least one embodiment, the physical address or location information can be used by the non-owning node to obtain the read data from a corresponding physical storage location on the BE non-volatile storage and the hash value can be used to verify the validity of the read data obtained from the BE non-volatile storage by the non-owning node.

In at least one embodiment, one or more criteria can be used to determine whether an owner node returns the smaller sized other information or the larger sized read data over the interconnection in response to an I/O redirection request or operation from the non-owner node. The one or more criteria can be used to determine whether the interconnect load or utilization of the interconnection between the nodes exceeds a specified maximum threshold, or more generally, determine when the interconnect is busy or overloaded. In at least one embodiment, in response to determining the interconnect load or utilization exceeds the maximum threshold, the other information can be returned rather than the read data to further limit placing added load or utilization on the interconnect due to the I/O redirection response. In this manner in at least one embodiment for a read I/O that requests read data stored at a target logical address where the read I/O is received at a non-owning node that does not own the logical address, the non-owning node can receive either in the redirection reply the read data itself or the other information including physical address or location information used by the non-owning node to access the read data. In such an embodiment, the non-owning node can obtain the requested read I/O read data to be returned to the requesting host bypassing multiple layers of the runtime stack of the data path or I/O path. In such an embodiment, the non-owning node can obtain the requested read data, either directly from the owner node or using the physical location information of the redirection reply, without traversing a chain of multiple MD pages of mapping information to access the read data. Rather in at least one embodiment using I/O redirection to an owner node, the owner node can traverse the particular chain of MD pages to access the read data in efforts to reduce contention for such MD pages between the two nodes. In at least one embodiment, at least some of the MD pages of mapping information can be associated exclusively with a single volume owned by a single node such that for I/Os directed to the single volume, only the single node owning the volume accesses such MD pages associated exclusively with the single volume thereby reducing or eliminating contention with the other non-owner node for such MD pages.

In at least one embodiment, the techniques of the present disclosure can provide a solution to minimize and/or reduce load on the interconnect for a storage configuration where volumes are presented as AO-AO or active-active over paths from both storage system nodes to the hosts but where the storage system internally maintains single node ownership per volume, or more generally, based on a suitable storage region ownership granularity. Another advantage of the techniques of the present disclosure in at least one embodiment is that adverse performance impact from redirection can be reduced and/or minimized in the AO-AO active-active configuration even in cases where the host independently chooses or selects to send I/Os to only a single node for one or more volumes. In at least one embodiment, the techniques of the present disclosure provide for generally taking into account the current load or utilization of the interconnection between the nodes to determine whether to return the relatively larger sized actual requested data or the relatively smaller sized additional information in order to reduce added load or utilization placed on the interconnection due to I/O redirection.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14a-14n through the communication medium 18. In this embodiment of the SAN 10, the n hosts 14a-14n access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14a-14n access and communicate with the data storage system 12, and also communicate with other components included in the SAN 10.

Each of the host systems 14a-14n and the data storage system 12 included in the SAN 10 are connected to the communication medium 18 by any one of a variety of connections as provided and supported in accordance with the type of communication medium 18. The processors included in the host systems 14a-14n and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14a-14n and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, ISCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like. Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22a to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
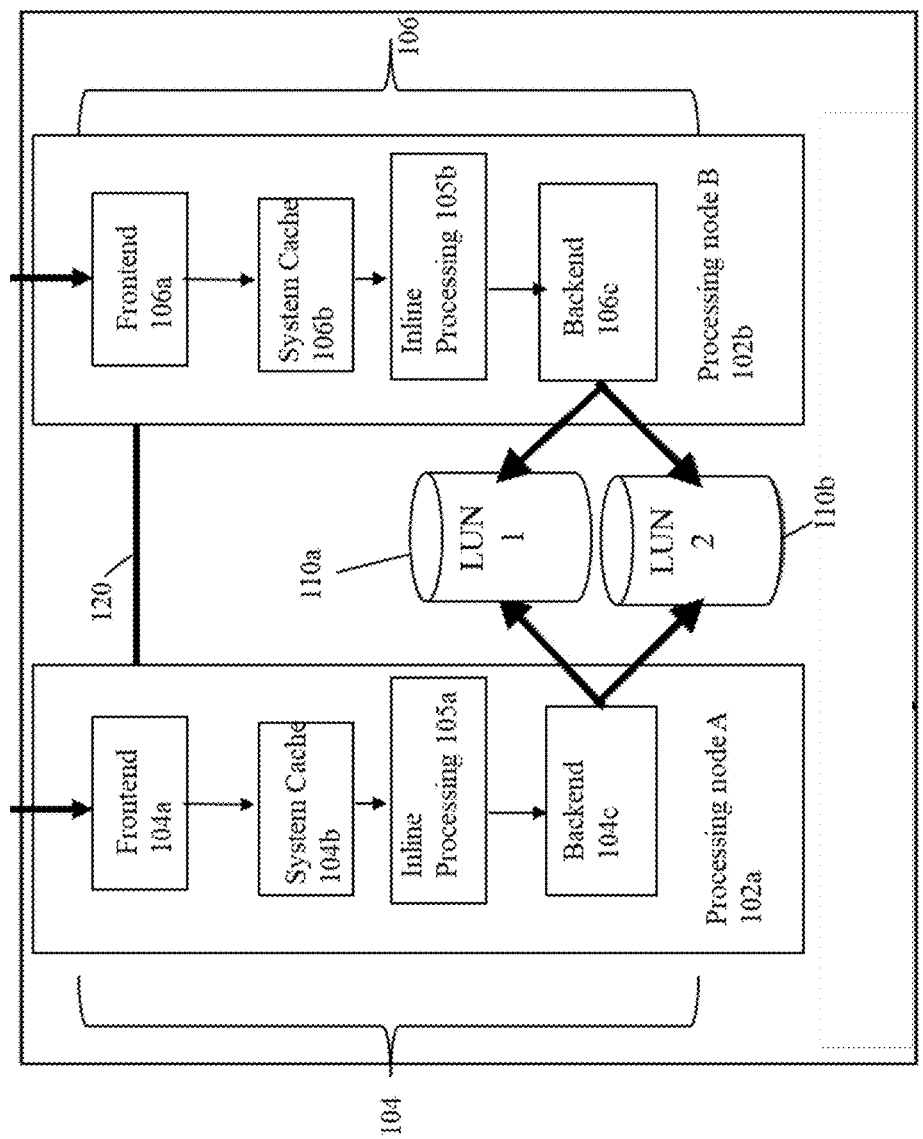
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102a and B 102b and the associated software stacks 104, 106 of the data path, where I/O requests can be received by either processing node 102a or 102b. In the example 200, the data path 104 of processing node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and non-volatile physical storage (e.g., back end physical non-volatile storage devices or PDs accessed by BE components such as DAs as described herein). During movement of data in and out of the system cache layer 104b (e.g., such as in connection with read data from, and writing data to, physical storage 110a, 110b), inline processing can be performed by layer 105a. Such inline processing operations of 105a can be optionally performed and can include any one of more data processing operations in connection with data that is flushed from system cache layer 104b to the back-end non-volatile physical storage 110a, 110b, as well as when retrieving data from the back-end non-volatile physical storage 110a, 110b to be stored in the system cache layer 104b. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102b has its own FE component 106a, system cache layer 106b, inline processing layer 105b, and BE component 106c that are respectively similar to the components 104a, 104b, 105a and 104c. The elements 110a, 110b denote the non-volatile BE physical storage provisioned from PDs for the LUNs, whereby an I/O can be directed to a location or logical address of a LUN and where data can be read from, or written to, the logical address. The LUNs 110a, 110b are examples of storage objects representing logical storage entities included in an existing data storage system configuration. Since, in this example, writes, or more generally I/Os, directed to the LUNs 110a, 110b can be received for processing by either of the nodes 102a and 102b, the example 100 illustrates what can also be referred to as an active-active configuration.

In connection with a write operation received from a host and processed by the processing node A 102a, the write data can be written to the system cache 104b, marked as write pending (WP) denoting it needs to be written to the physical storage 110a, 110b and, at a later point in time, the write data can be destaged or flushed from the system cache to the physical storage 110a, 110b by the BE component 104c. The write request can be considered complete once the write data has been stored in the system cache whereby an acknowledgement regarding the completion can be returned to the host (e.g., by component the 104a). At various points in time, the WP data stored in the system cache is flushed or written out to the physical storage 110a, 110b.

In connection with the inline processing layer 105a, prior to storing the original data on the physical storage 110a, 110b, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110a, 110b.

In connection with a read operation to read a block of data, a determination is made as to whether the requested read data block is stored in its original form (in system cache 104b or on physical storage 110a, 110b), or whether the requested read data block is stored in a different modified form or representation. If the requested read data block (which is stored in its original form) is in the system cache, the read data block is retrieved from the system cache 104b and returned to the host. Otherwise, if the requested read data block is not in the system cache 104b but is stored on the physical storage 110a, 110b in its original form, the requested data block is read by the BE component 104c from the backend storage 110a, 110b, stored in the system cache and then returned to the host.

If the requested read data block is not stored in its original form, the original form of the read data block is recreated and stored in the system cache in its original form so that it can be returned to the host. Thus, requested read data stored on physical storage 110a, 110b can be stored in a modified form where processing is performed by 105a to restore or convert the modified form of the data to its original data form prior to returning the requested read data to the host.

Also illustrated in FIG. 2A is an internal network interconnect 120 between the nodes 102a, 102b. In at least one embodiment, the interconnect 120 can be used for internode communication between the nodes 102a, 102b.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs are non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file used to log user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
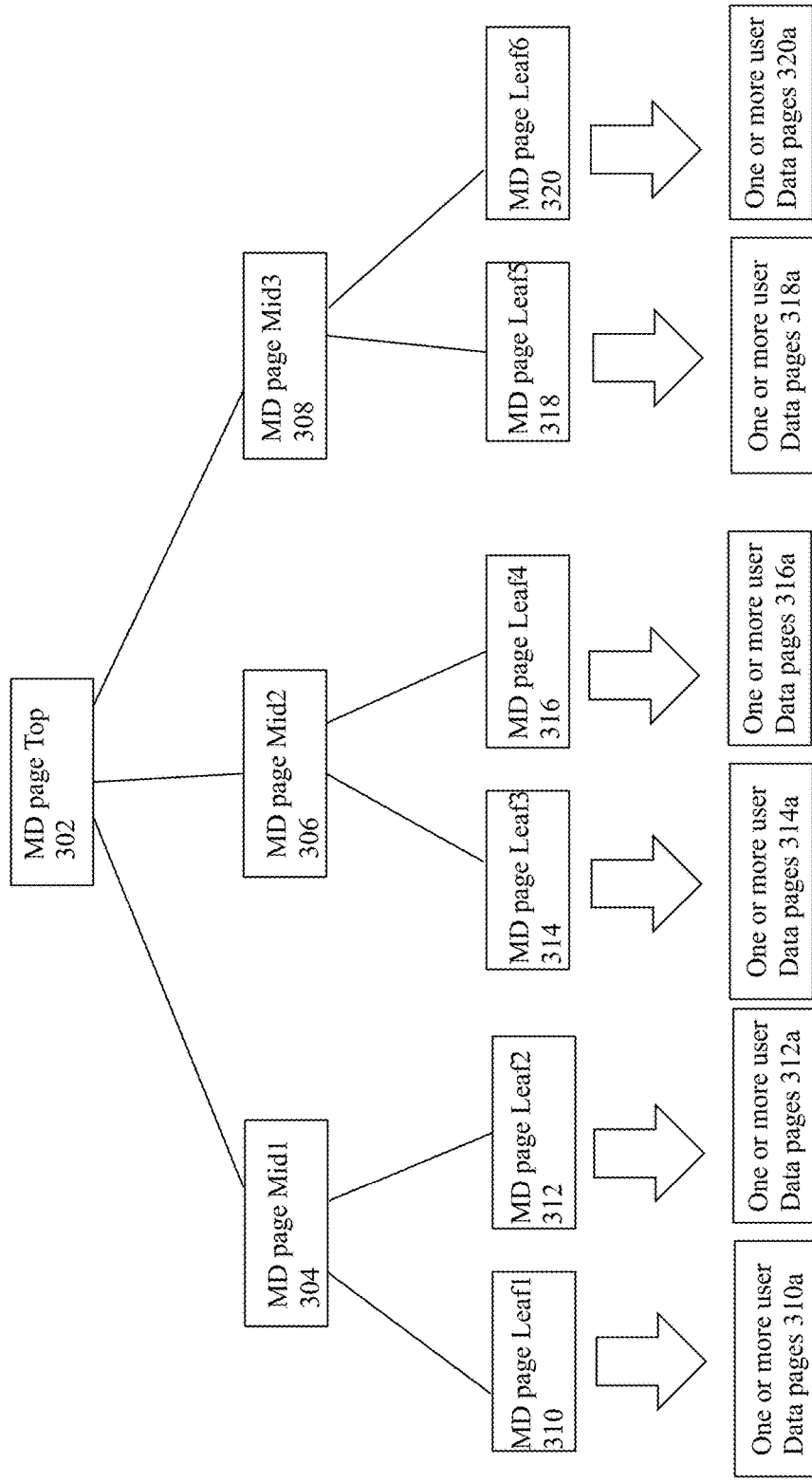
FIGS. 3, 4, and 5 are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
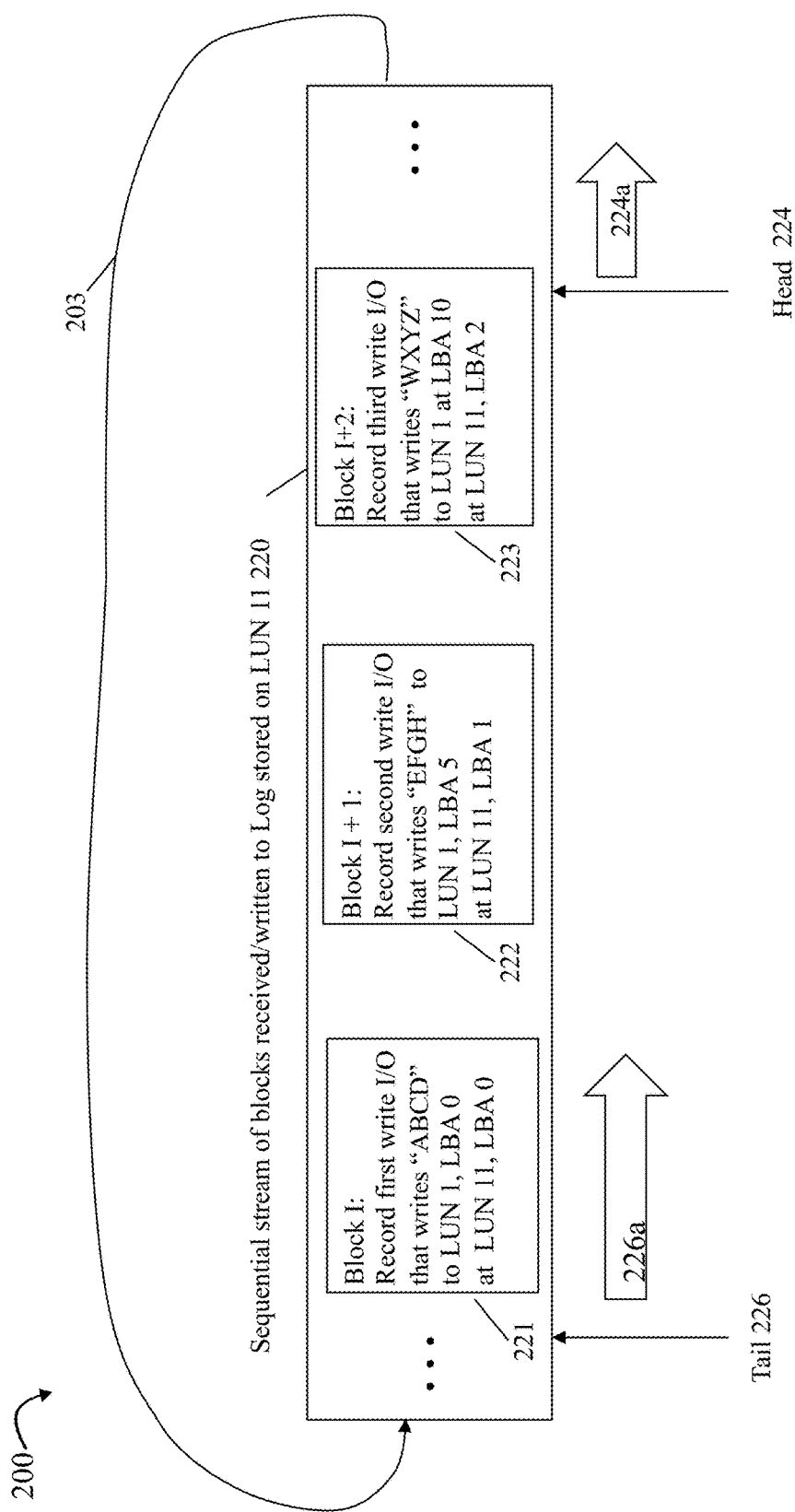
FIGS. 2B, 2C, 2D and 2E are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
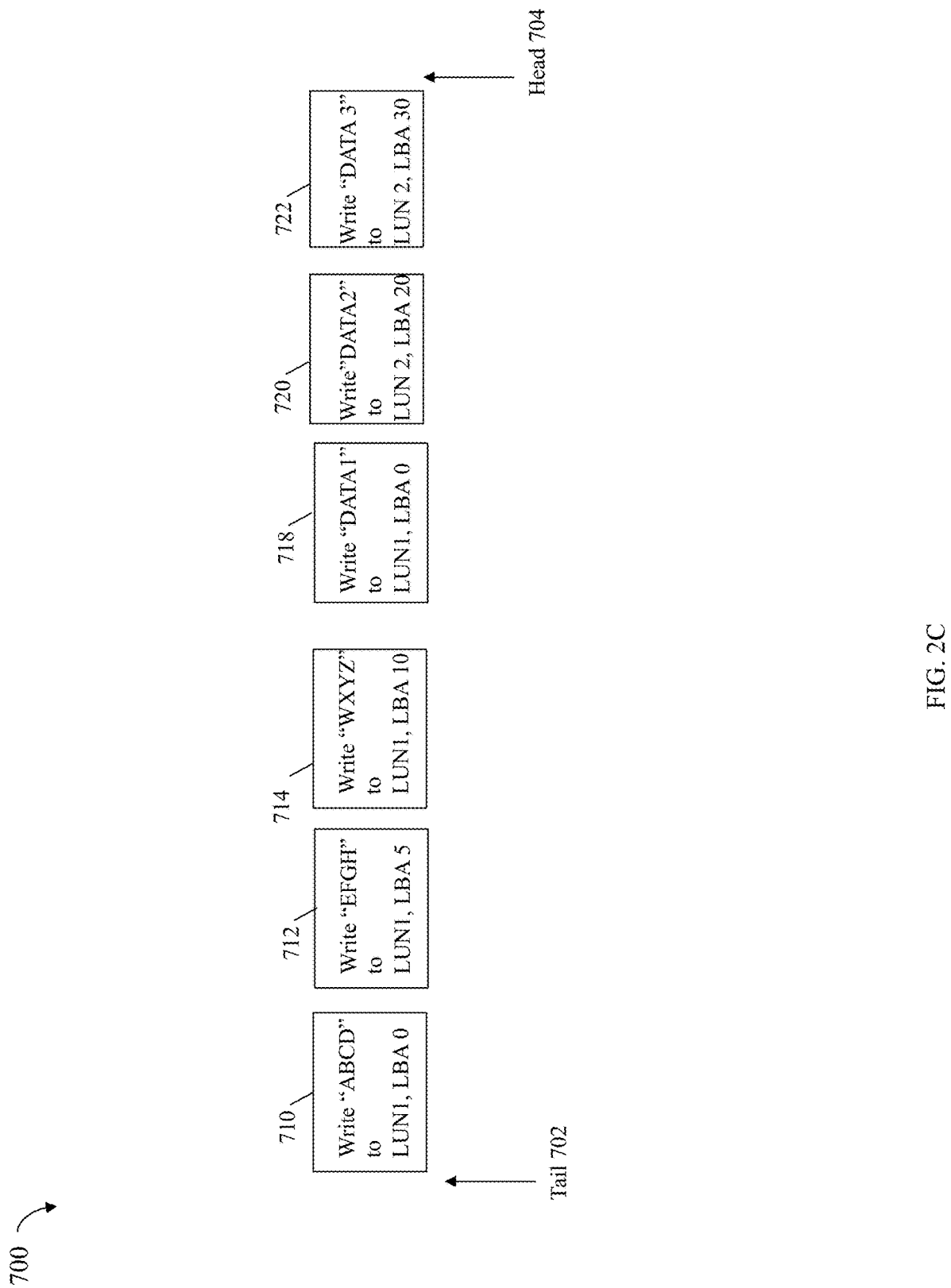

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
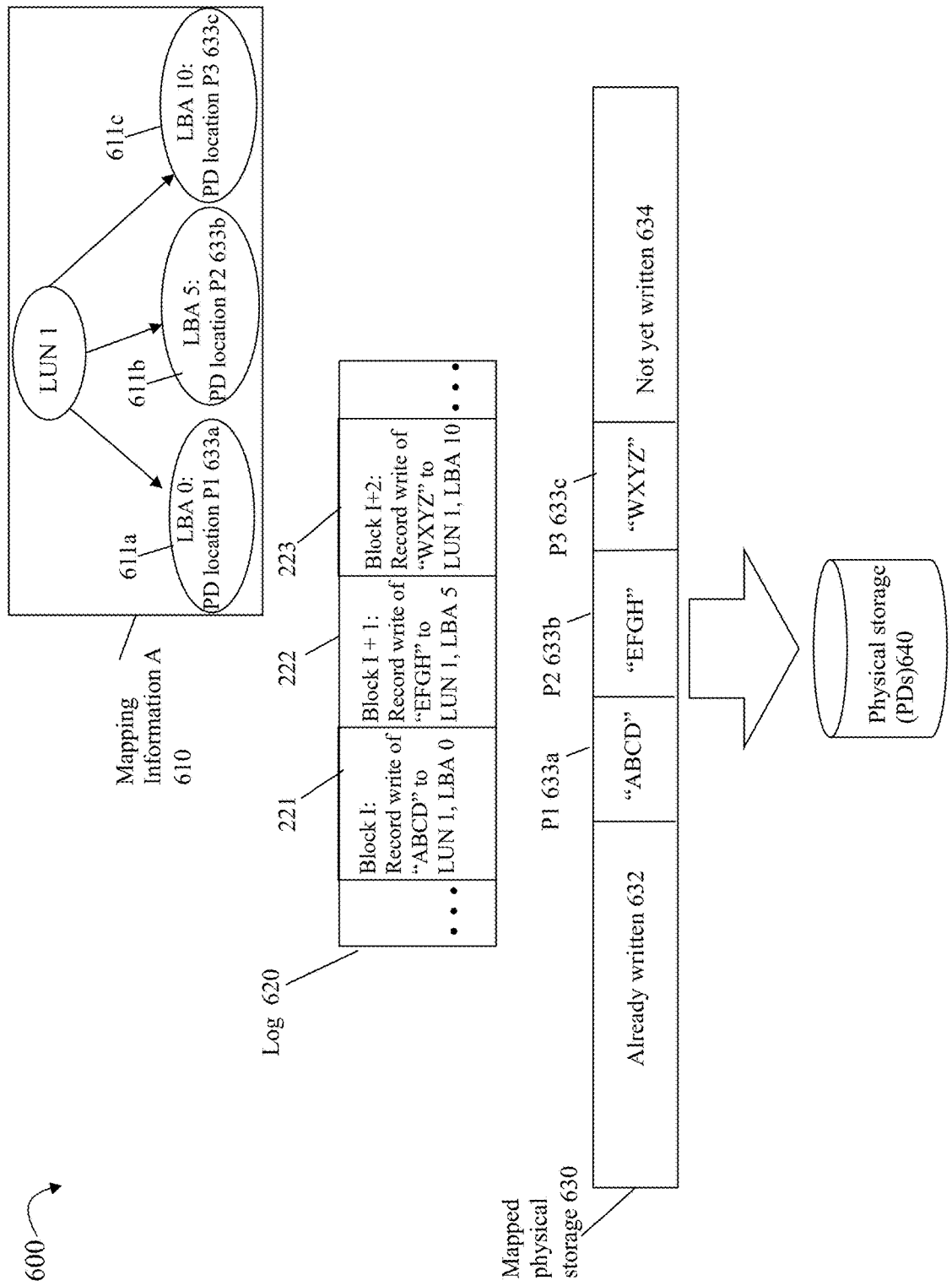

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611a-c denoting the mapping information, respectively, for the 3 target logical address of the 3 recorded write I/O operations in the log records 221, 222, and 223. The element 611a of the mapping information denotes the mapping information for the target logical address LUN1, LBA 0 of the block 221 of the log 620. In particular, the block 221 and mapping information 611a indicate that the user data "ABCD" written to LUN 1, LBA 0 is stored at the physical location (PD location) P1 633a on the physical storage 640.

The element 611b of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log with a layout which is sequential in the order it is written to the log.

The data layout of the flushed log data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630. In at least one embodiment, modifications to metadata including mapping information used by the data storage system can also be recorded in the log 620 and flushed to the mapped physical storage 630, and thus the BE PDs 640, in a manner similar to that as described herein for the written user data which can include data written by host-based writes.

Consistent with other discussion herein, the mapped physical storage 630 can correspond to the BE PDs providing BE non-volatile storage used for persistently storing user data as well as metadata, such as the mapping information. With a log structured system as discussed herein, as recorded writes in the log are processed, the data written by the writes can be written to new sequential physical storage locations on the BE PDs. Thus, with a log structured system, the data and associated metadata can be written sequentially to the log 620 and also can be written sequentially to the mapped physical storage 630. Thus, one characteristic of log structured systems (LSSs) is that updates do not overwrite the existing copy, such as of user data written by a write operation. Rather, the updated or new data written at a target logical address can be stored at a next sequential location in the log and also in a next sequential physical storage location on the BE PDs. In an LSS of the data storage system in at least one embodiment, the physical storage 630 denoting the physical storage of the BE PDs can also be implemented and managed as a logical circular log in a manner similar to that as described above in connection with the log of FIGS. 2B, 2C and 2D containing the data prior to being flushed to the physical storage 630 of the BE PDs.

In data storage systems implementing an LSS such as described here, garbage collection can be performed by the data storage system at various times in an embodiment. Garbage collection processing can be performed by the data storage system on the BE PDs to aggregate allocated stored data blocks with valid data to eliminate free unused physical storage locations (e.g., which can store invalid or stale content of overwritten logical addresses) that can be interspersed between the data blocks containing valid data. Such aggregation can include physically copying or moving data blocks of valid user data stored at various physical locations on BE non-volatile storage into a single larger physical storage location. From the perspective of the data storage system, valid data can include the current or most recent copy of client-based write data such as host-based write data (e.g., written by write I/Os received from one or more hosts), as well as the current or most recent copy of flushed metadata, such as the mapping information used by the data storage system to locate a current copy of content associated with a logical address such as, for example, of a read or write I/O operation. After the valid data blocks are relocated from their source locations on multiple source blocks to target locations of a target block, the source blocks can denote larger contiguous chunks of storage which are free and available for reuse. Having such a larger contiguous chunk of free storage facilitates efficiently fulfilling subsequent allocation requests for free BE PD capacity from different components for different uses. Such subsequent allocation requests can include, for example, requests for storing data that is flushed from the log as well as other requests for larger amounts of storage.

A specified size or chunk of physical storage of the BE PDs can be referred to as a physical large block or PLB. In at least one embodiment, garbage collection can be performed on physical storage units that are PLBs. In at least one embodiment, each PLB can be 2 MBs in size. Within a single PLB, the valid data and the holes (e.g., containing invalid data or designated as an unused portion) can be interspersed since, for example, write granularity size units can be 4K chunks or blocks.

In a data storage system implementing an LSS, garbage collection (sometimes denoted herein as GC) can be performed by the data storage system in a continuous manner to manage its BE PDs and reclaim physical storage of holes including unused storage or storage with invalid data. The GC results in performing additional overhead operations such as additional read and write operations in connection with reading valid data from the multiple source PLBs and aggregating and writing the valid data of the multiple source PLBs to a single target PLB. In this manner, the source PLBs can be freed and made available for reuse. In a data storage system or DS which implements an LSS, such as described above for storing writes or updates to user data, the DS itself can perform GC as needed to obtain free contiguous chunks of storage such as non-volatile storage on the BE PDs. The GC performed by the DS can be done as a maintenance or background task as user logical addresses are overwritten or updated with multiple writes to the same logical address. In this case, the DS can perform GC to reclaim and reuse the storage which contains old or invalid content that is replaced or updated with new content in the LSS. Consistent with other discussion herein, both valid content and invalid content can be stored within a first large contiguous chunk of storage whereby the DS can perform GC to move the valid content to a second chunk in order to free all storage within the first chunk. Such GC as performed by the DS results in write amplification denoting the extra or additional writes performed in connection with copying or moving valid content in order to obtain the contiguous free chunk of storage.

In at least one embodiment, each PLB can be further partitioned into smaller units of storage such as multiple data pages. For example in at least one embodiment, each PLB can be 2 MB in size where the PLB can be further partitioned into 4K byte pages.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Figure 2E:
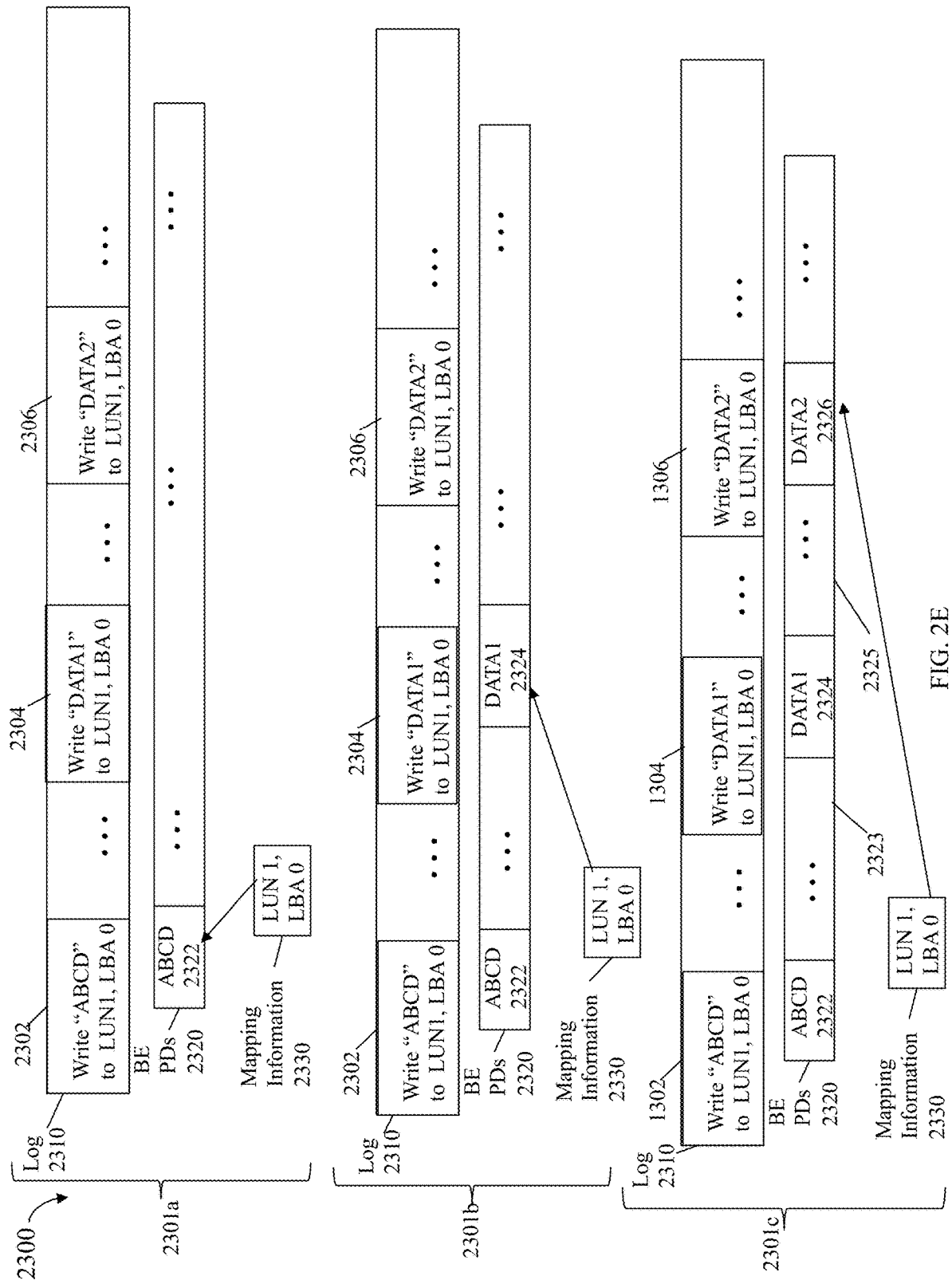

For example with reference to FIG. 2E, the element 2301a can denote the state of the log file 2310, BE PDs 2320 and mapping information 2330 at a first point in time T1 after processing the record 2302 for a first write of "ABCD" to the logical address LUN A, LBA 0. The data written "ABCD" by the recorded write of 2302 can be stored at the BE PD location 2322. Thus, flushing the log record 2302 results in storing the write data "ABCD" to the BE PD location 2322 and additionally updating the mapping information 2330 to reference the BE PD location 2322. The mapping information 2330 denotes the metadata used to map the logical address LUN 1, LBA 0 to the current physical location on the BE PDs containing the user data or content stored at the logical address LUN 1, LBA 0. After the log record 2302 is flushed from the log 2310, the record 2302 is available and can be subsequently reclaimed for reuse for logging other operations in the log 2310.

At a second point in time T2 subsequent to T1, the log record 2304 can be processed and flushed to the BE PDs 2320. The element 2301b denotes the state of the log file 1310, BE PDs 1320 and mapping information 1330 at the second point in time T2 after processing the record 1304 for a second write of "DATA1" to the logical address LUN A, LBA 0. The data written "DATA1" by the recorded write of 1304 can be stored at the BE PD location 1324. Thus, flushing the log record 1304 results in storing the write data "DATA1" to the BE PD location 1324 and additionally updating the mapping information 1330 to reference the BE PD location 1324 denoting the physical location containing the data stored at the LUN 1, LBA 0 at the time T2. Additionally, the PD location 1322 can be invalidated since it no longer contains valid current data for the logical address LUN 1, LBA 0, whereby the PD location 1322 can be available for reuse. After the log record 1304 is flushed from the log 1310, the record 1304 is available and can be subsequently reclaimed for reuse for logging other operations in the log 1310.

At a third point in time T3 subsequent to T2, the log record 2306 can be processed and flushed to the BE PDs 2320. The element 2301*c* denotes the state of the log file 2310, BE PDs 2320 and mapping information 2330 at the third point in time T3 after processing the record 2306 for a third write of "DATA2" to the logical address LUN A, LBA 0. The data written "DATA2" by the recorded write of 2306 can be stored at the BE PD location 2326. Thus, flushing the log record 2306 results in storing the write data "DATA2" to the BE PD location 2326 and additionally updating the mapping information 2330 to reference the BE PD location 2326 denoting the physical location containing the data stored at the LUN 1, LBA 0 at the time T3. Additionally, the PD location 2324 can be invalidated since it no longer contains valid current data for the logical address LUN 1, LBA 0, whereby the PD location 2324 can be available for reuse. After the log record 2306 is flushed from the log 2310, the record 2306 is available and can be subsequently reclaimed for reuse for logging other operations in the log 2310.

As illustrated by the elements 2301*a-c*, over time, the physical storage locations 2322, 2324 of the BE PDs 2320 become free and available for reuse. The other physical storage locations 2323, 2325 and 2326 can still contain valid data. Thus, the free, available reusable physical storage locations 2322, 2324 can form holes or segments interspersed among the other portions 2323, 2325, 2326 containing valid data. More generally, the size of the holes 2322, 2324 can be of varying sizes and can include multiple user data blocks or pages. Additionally, portions of physical storage of the BE PDs can also be similarly allocated and then freed for reuse for other purposes. Thus, the holes of free, reusable physical storage as well other portions of physical storage including valid data can result not only from flushing the log file but also from other purposes that can vary with embodiment.

As noted above, in a data storage system implementing an LSS, GC can be performed by the data storage system at various times in an embodiment. For example, GC can relocate and aggregate valid data from multiple source blocks, such as 2323, 2325 and 2326 at the time T3, to a single destination or target block. After such relocation and aggregation by GC, the storage locations 2322, 2323, 2324, 2325 and 2326 denote a larger contiguous chunk of storage that is free and available for reuse. Having such a larger contiguous chunk of free storage facilitates efficiently fulfilling subsequent allocation requests for free BE PD capacity from different components for different uses. Such subsequent allocation requests can include, for example, requests for storing data that is flushed from the log as well as other requests for larger amounts of storage.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310*a*, 312*a*, 314*a*, 316*a*, 318*a* and 320*a*.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312*a*. In order to access UD page X of 312*a*, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310*a*, 312*a*, 314*a*, 316*a*, 318*a* and 320*a* include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310a, 312a, 314a, 316a, 318a and 320 each include user data stored on particular logical addresses of the LUN A's logical address space. It may be, for example, that element 310a includes user data stored at a first set of LBAs 0-511; and that element 312a includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310a denotes data pages for LBAs 0-511; the element 312a denotes data pages for the LBAs 512-1023; the element 314a denotes data pages for LBAs 1024-1535; the element 316a denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310a denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310a.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
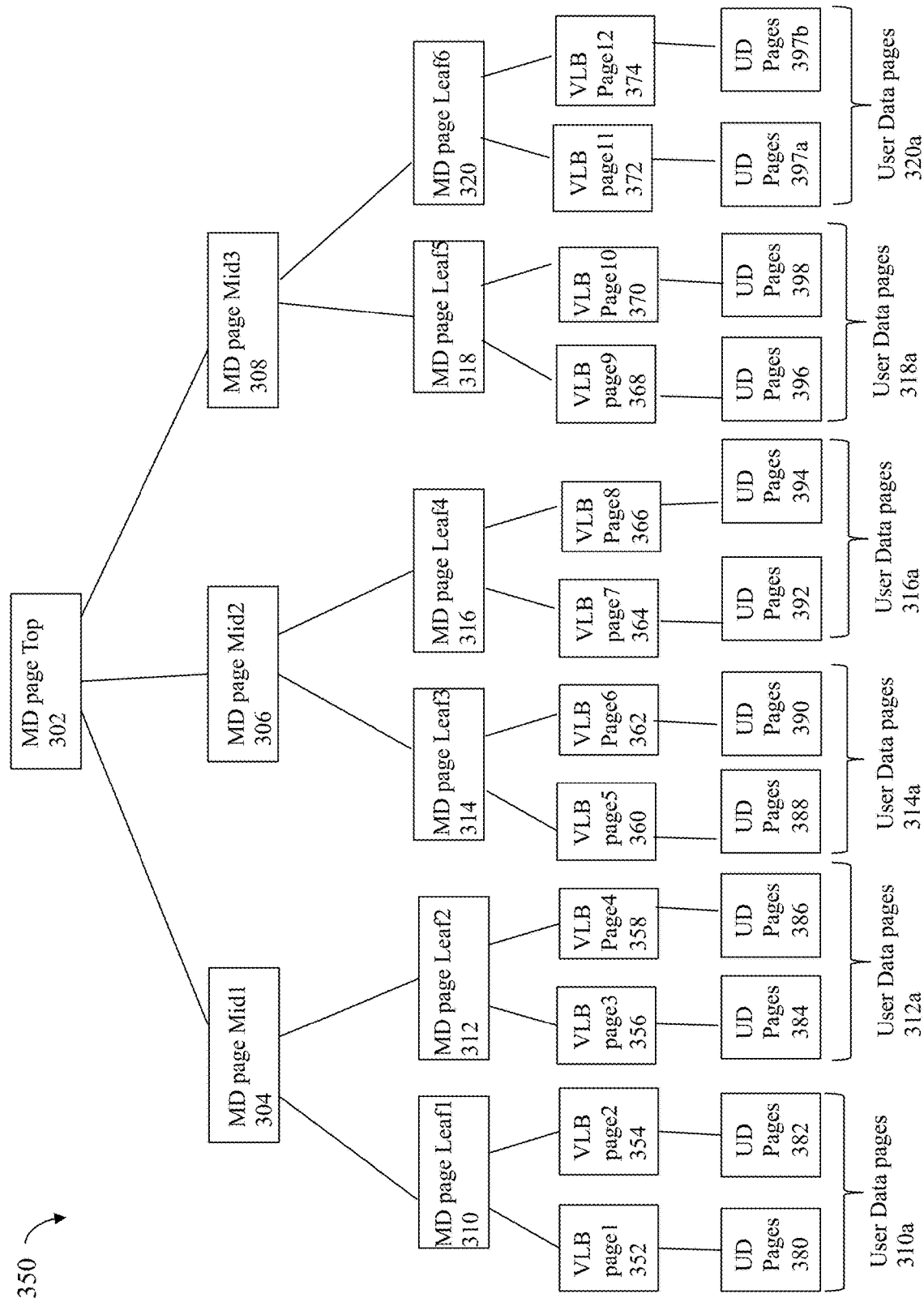

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages—MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
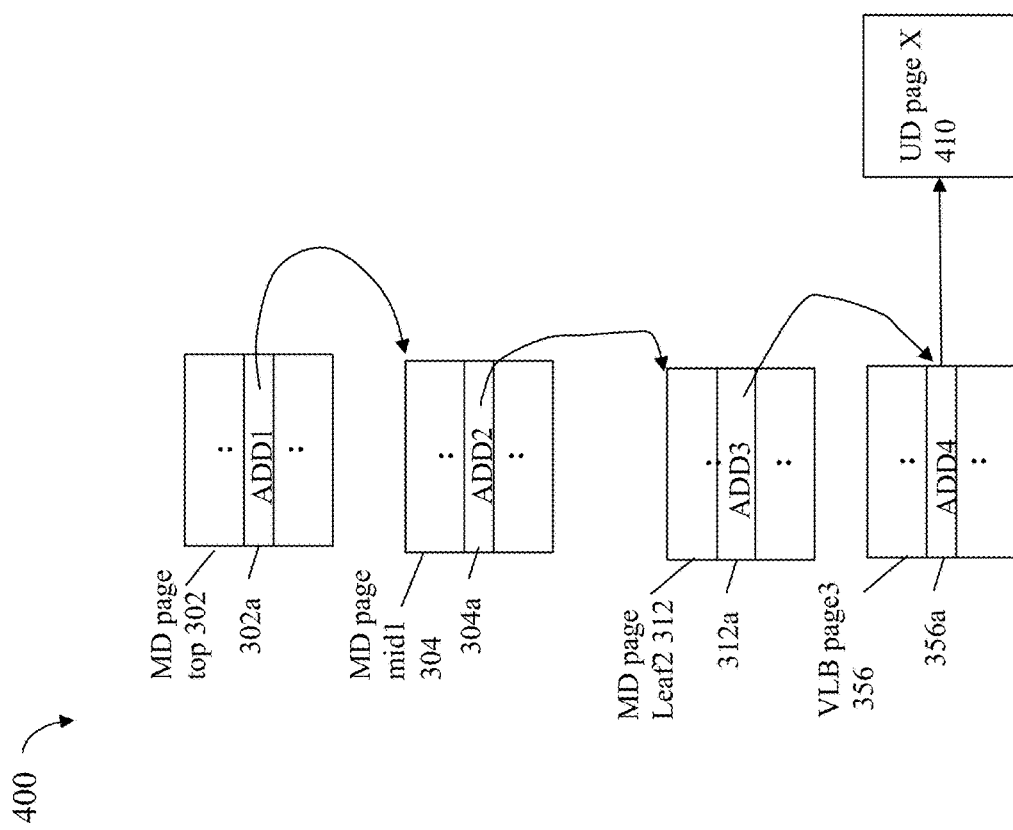

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the particular mid level MD page, such as MD page mid1 304, that is accessed next in the sequence.

Continuing with the example 400, the MD page mid1 304 can be accessed where the location 304a is read to obtain the address or pointer ADD2 from location 304a. In at least one embodiment, the particular entry or offset 304a of the MD mid1 page can be determined based on the logical address being mapped. The address or pointer ADD2 can then be used to identify the particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies the MD page leaf 2 312. If the MD page 312 is not already in cache, the on-disk copy of the MD page 312 on a PD can be read to obtain the content of location 312a. In at least one embodiment, the particular desired entry or offset 312a of the MD leaf2 page 312 can be determined based on the logical address being mapped. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-5.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-5.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6A.

In at least one embodiment, updates or modifications to the MD pages of the MD or mapping structure described in connection with the FIGS. 3-5 can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-5 can be persistently stored in a MD page store on the BE PDs of the system. In some contexts herein, the copy of a MD page as stored in the MD page store on the BE PDs can also be referred to herein as the on-disk copy of the MD page.

As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the log can include updating the corresponding MD pages which map the logical address to its corresponding BE PD location including the content stored at the logical address. In at least one existing system, the mapping information including MD pages as described herein can thus be updated. For example, such updating of the mapping information can include updating any of the top, mid and leaf MD pages used in connection with mapping the logical address to the BE PD location including the content stored at the logical address. In at least one existing implementation, updating the corresponding mapping information and MD pages can include loading all the MD pages into the cache if any such MD pages are not already in cache. The MD pages of the mapping information can be characterized as a chain forming an access sequence of top MD page, mid MD page, and leaf MD page.

Described in the present disclosure are techniques that use a mapping cache of page descriptors. The techniques of the present disclosure provide for improved read cache miss performance and improved use of cache. The mapping cache can be used to bypass the chain of mapping information. In at least one embodiment the mapping cache can be implemented using a hash table with the key being a logical address which is mapped to a corresponding page descriptor (sometimes simply referred to herein as descriptor). Thus the mapping cache can include page descriptors associated with corresponding logical addresses. The corresponding page descriptor can include physical location information, such as an address, pointer or reference to the physical location containing the current or up-to-date content stored at the logical address. In at least one embodiment, the size of descriptors stored in the mapping cache can generally be much smaller than the actual content or user data (as may be stored using a traditional data cache). Generally, for a specified number of logical addresses, the amount of cache consumed to store corresponding descriptors for the logical addresses is expected to be much less than the amount of cache consumed to store the actual content or user data stored at the logical addresses. Thus it can be expected that a much larger number of descriptors can be stored in an amount of cache as compared to the number of logical addresses whose content can be stored in the same amount of cache.

In at least one embodiment, read I/O processing which reads data from a target logical address can include querying the hash table of the mapping cache. A lookup of the hash table can be performed using the target logical address as the key. A hash function F can be used which maps the target logical address LA to an entry or index j of the hash table HT (e.g., F(LA)=HT(j)). If the mapped entry or index HT(j) does include a corresponding page descriptor for the target logical address, a hit occurs with respect to the mapping cache and thus hash table thereof. Alternatively, if the mapped entry or index HT(j) does not include a corresponding page descriptor for the target logical address, a miss occurs with respect to the mapping cache and thus hash table thereof. Responsive to the hit with respect to the hash table of the mapping cache, the corresponding page descriptor as stored in, or associated with, HT(j) of the mapping cache can be used to access the requested read data stored at the target logical address. In at least one embodiment, the page descriptor can include the target logical address; and also physical location information such as a pointer, address or reference to the physical storage location containing the requested read data stored at the target logical address. Thus, processing the read I/O responsive to the hit with respect to the hash table (e.g., HT(j)) of the mapping cache can include reading the requested read data using the pointer, address or reference to the physical storage location of the page descriptor returned by the query or lookup in the hash table. In at least one embodiment, the hash table can include "N" entries or hash lines, where each such entry or hash line can be further associated with a bucket of one or more page descriptors mapped to the single entry or hash line of the hash table. Thus each entry, hash line or bucket can correspond to a single index of the hash table. A given logical address LA can be mapped, using the hash function F, to a corresponding hash table (HT) entry, index or bucket "j". It may be possible for multiple different LAs to map to the same HT(j). In at least one embodiment each HT(j) denoting a hash line, bucket, index or entry, can include all page descriptors of associated logical addresses which map to j using the hash function F, where such page descriptors are stored in the mapping cache and associated with HT(j). In at least one embodiment, each entry, index or bucket HT(j) can include a linked list of pages descriptors having associated logical addresses which map to entry, index or bucket HT(j). In at least one embodiment, each bucket HT(j) can be a singly linked list of page descriptors having associated logical addresses which hash or map (using the hash function) to HT(j).

In at least one embodiment as noted above, a miss with respect to the hash table of the mapping cache, and thus the hash table thereof, can occur if there is no corresponding page descriptor stored in the hash table for the target logical address, where the target logical address is mapped by the hash function F to the index, entry or bucket j of the hash table (e.g., HT(j) does not include a page descriptor with a stored logical address matching the target logical address). Responsive to the miss with respect to the hash table of the mapping cache, processing can include: using the chain of mapping information to access the requested read data; obtaining a free or new page descriptor which is updated to include relevant corresponding information for the target logical address; and associating the page descriptor with the corresponding entry, index or bucket HT(j) for the target logical address. Updating the page descriptor for the target logical address as part of mapping cache miss processing for the read I/O can include updating the page descriptor to include: the physical location information, such as including an address, pointer or reference to the physical storage location including the content or user data stored at the target logical address; and to include the target logical address.

In at least one embodiment, the techniques of the present disclosure can use a hash value such as a cryptographic hash value HV1 obtained using a cryptographic hash algorithm or function CHF applied to user data or content stored at a logical address. The cryptographic hash value can be stored and maintained in the page descriptor associated with the logical address. The cryptographic hash value can be used to validate and determine whether using the page descriptor results in obtaining the current or up-to-date content for the logical address, where such content can be returned to the host or requester which issued the read I/O. As discussed in more detail below, the cryptographic hash value stored in the page descriptor can be used in validation processing to detect cases where the descriptor is stale, out of date, or invalid. In at least one embodiment, when adding a page descriptor to the hash table of the mapping cache for a logical address, a cryptographic hash or hash value HV1 of the content or user data stored at the logical address can be calculated using the CHF, where HV1 can then be stored in the page descriptor along with other information discussed herein. In this manner, the cryptographic hash HV1 of the descriptor can represent the expected user data or content associated with the descriptor and its corresponding logical address (also stored in the descriptor) at the time the page descriptor is added to the hash table. Subsequently when using the descriptor (such as with hit processing with respect to the mapping cache) to retrieve user data or content which is associated with the descriptor and which is stored at a logical address, the reference, pointer or address of the descriptor (e.g., physical location information) can be used to read existing stored content from non-volatile BE storage. Validation processing can then be performed to validate the existing content read. Validation processing can include computing a second cryptographic hash HV2 for the existing content read from the non-volatile BE storage using the same hashing algorithm, such as the same cryptographic hashing function or algorithm CHF, used to compute HV1. HV1 can be compared to HV2. If HV1 matches or equals HV2, validation processing succeeds, determines that the descriptor including HV1 is valid, determines that the existing content read is valid, and determines that the existing content read can be returned such as in response to the read I/O reading from the logical address. Put another way, if HV1 matches HV2, it can be determined that first content (which was stored at the physical location described by descriptor when the descriptor was first added to the hash table) matches the existing content read at a point in time subsequent to when the page descriptor was added to the hash table. If HV1 does not match or does not equal HV2, validation processing fails and determines that the existing content read is invalid and the descriptor including HV1 is also invalid. Thus, an embodiment can generally use a CHF or other sufficiently strong hashing algorithm in connection with validation processing such that the probability of the CHF or other algorithm generating the same hash value for two different data values is non-existent or sufficiently small.

In at least one embodiment, a user data (UD) or client logical address, which can be the target logical address of a client I/O operation such as a read or write operation, can be uniquely identified using a volume or logical device ID (identifier) in combination with an LBA (logical block address) or offset.

Consistent with discussion herein, mapping information including a chain of MD pages can be used in at least one embodiment in a log structured system (LSS) to convert or map user data logical addresses to corresponding physical storage locations where content of the logical addresses is stored on BE non-volatile storage. The mapping information, such as the chain of multiple MD pages noted above, can be stored persistently on non-volatile BE storage. When performing I/O operations such as a read I/O, relevant MD pages of mapping information need to be brought into cache such as in order to access requested read data from non-volatile BE storage when servicing a read cache miss. Consistent with other discussion herein, the storage system can be configured as a dual node active-active AO-AO configuration where the volumes of the storage system can be presented and accessed by the host over paths from both nodes. In this manner, the host can issue I/Os directed to volumes over paths to both nodes. If reads or other I/Os are received and processed by both nodes in a dual node active-active AO-AO storage system configuration without any assigned volume or storage region ownership among the nodes, then the relevant mapping information needs to be read and generally accessible to both nodes. To coordinate or synchronize needed accesses to such mapping information of MD pages between the nodes with no ownership, additional overhead such as internode communication over the interconnect between the nodes results and can adversely affect performance.

In at least one embodiment, the techniques of the present disclosure provide for the storage system internally tracking and operating in accordance with a defined ownership of volumes or other storage region level of granularity. In at least one embodiment, ownership of each volume can be assigned to a single one of the two nodes in a dual node system. As a variation, more generally, the techniques of the present disclosure can assign ownership of various storage regions or defined storage areas among the two nodes, where the storage regions or areas can be any suitable level of storage granularity. For example as a first variation in at least one embodiment, the logical address space under management using the techniques of the present disclosure can be partitioned into defined storage regions of the same or different sizes independent of volumes. In some scenarios, each storage region can include less than a single volume, can include collective logical addresses associated with one or more volumes, and/or can include logical addresses associated with one or more volumes and further including only a subrange or subvolume portion of logical addresses of another volume. As yet another example, an embodiment can partition the logical address space of multiple volumes or LUNs managed using the techniques of the present disclosure into slices or portions, where each such slice or portion can denote a sub-LUN or sub-volume portion. For example, in at least one embodiment, the logical address space of one or more volumes can be partitioned into slices or units each being 2 MB or some other suitable size unit. Each slice or unit can be assigned a unique slice identifier (ID) from a sequential consecutive integer sequence of integers beginning with 0 or alternatively 1. In at least one embodiment, the slice IDs and increase with associated logical addresses of the logical address space. Subsequently, the slices can be partitioned into an even set of even slices having even slice IDs and an odd set of odd slices having odd slice IDs, where the even set of slices can be assigned to or owned by a first node A and where the odd set of slices can be assigned to or owned by a second node B.

Thus although the following paragraphs provide examples with a per volume ownership by a node, more generally the techniques of the present disclosure can be used with any suitable storage granularity of storage ownership by a node.

In at least one embodiment, the techniques of the present disclosure provide for logical ownership of volumes among the nodes such that each single volume is owned by only a single one of the nodes even though from the host perspective the storage system has an active-active configuration where the host can issue I/Os to the single volume to both nodes. In at least one embodiment, the concept of storage ownership such as at the per volume or other level of granularity can be internally within the storage system and may not be exposed to the host. Thus with respect to an I/O operation such as a read or write I/O operation directed to a target logical address LA1, where LA1 can denote a volume or LUN and associated LBA (logical block address or offset in the volume's logical address space), the LA1 can be characterized as owned by a single one of the nodes where such ownership can be based on a per volume level of ownership or some other suitable storage region granularity of ownership. Thus in embodiments assigning ownership of each single volume to a single one of the nodes, a first node receiving an I/O directed to LA1 can be characterized as the owner or non-owner of LA1 based on the owner of the particular volume or logical device comprising LA1.

In at least one embodiment, a non-owning node that does not own a particular logical address does not cache information about the logical address and does not cache data or content stored at the particular logical address such as in a node-local cache such as a volatile memory cache. In at least one embodiment, only the owner node of a logical address can cache information about the logical address in the node-local cache, and can cache data or content stored at the logical address in the node-local cache. Thus in at least one embodiment where each volume is assigned ownership to a single node, only the owner node, but not the non-owner peer node, can cache information about the logical address in a respective owner node's local cache, and can cache content or data storage at logical addresses of the volume in a respective owner node's local cache.

In at least one embodiment, hosts can issue I/Os and other operations directed to volumes configured from physical storage on a storage system. The hosts can issue I/Os to volumes over paths to both nodes of the dual node storage system configured as an active-active configuration. Thus hosts can issue I/Os directed to volumes to both nodes. However, in at least one embodiment transparent to the hosts, I/Os directed to a volume or more generally a logical address not owned by the receiving node can be redirected to the peer owner node for associated processing. In at least one embodiment if a read I/O or request is received by a non-owning node, the read I/O or request can be redirected to the owner peer node for processing by issuing a redirect or redirection request to the owner node. The processing can include traversing the chain of MD pages to access requested data from the BE non-volatile storage. In response, the owner node can return a redirect or redirection reply to the non-owner node where the redirect reply can include either the requested read data itself, or other information including physical location information, such as a reference to or physical address of the read data, that the non-owner node can use to obtain the read data from the BE non-volatile storage. In at least one embodiment, the owner node can return either the requested read data or the other information based, at least in part, on the current load or utilization of the interconnection between the nodes. More generally in at least one embodiment, the owner node can return either the requested read data or the other information based, at least in part, on one or more criteria used to determine whether the interconnection between the nodes is overloaded and/or overutilized or more generally excessively busy (as evaluated in accordance with the one or more criteria).

In at least one embodiment, the actual read data can have an associated size that is larger than an alternative smaller sized redirection reply or response including the other information, such as the physical location information that can include a reference to, pointer to, or physical address of, the read data used by the non-owner to obtain the read data from the BE non-volatile storage.

In at least one embodiment, the one or more criteria can include a first condition that specifies if the current utilization of the interconnect between the nodes is greater than a specified utilization threshold, the other information is returned in the redirection reply rather than the actual read data, and otherwise the actual read data can be returned. In at least one embodiment, the current utilization and associated utilization threshold can denote percentages between 0 and 100%.

In at least one embodiment, the one or more criteria can include a second condition that specifies if the currently consumed bandwidth of the interconnect between the nodes is greater than a specified threshold or percentage of its maximum supported or capable bandwidth, the other information is returned in the redirection reply rather than the actual read data, otherwise the actual read data can be returned. In at least one embodiment, the second condition can specify that if the current bandwidth consumption exceeds 85% or some other suitable percentage of the maximum supported bandwidth capability of the interconnect, then the other information is returned in the redirection reply, and otherwise the read data is returned. In at least one embodiment, the second condition can specify that if the current bandwidth consumption exceeds a specified maximum allowable threshold, then the other information is returned in the redirection reply, and otherwise the read data is returned. In at least one embodiment, the bandwidth can denote a bandwidth rate or data transfer capacity of the interconnect between the nodes in a measurement such as number of bits (or other suitable amount of data) transferred per second (or other suitable unit of time).

In at least one embodiment, the one or more criteria can include a third condition that specifies if the total current number of outstanding or pending I/O requests in the storage system exceeds a specified threshold, then the owner node can return the other information in the redirection reply rather than the actual data, and otherwise can return the actual data. In at least one embodiment, the number of outstanding or pending I/O requests can denote a total number of I/O requests, such as from hosts or other storage clients, that have been received at the storage system but for which a response or reply has not yet been returned to the host or other storage client originating the I/O.

In at least one embodiment, the one or more criteria can include a fourth condition that specifies if the total current number of outstanding or pending I/O redirection requests exceeds a specified threshold, then the owner node can return the other information in the redirection reply rather than actual data, and otherwise can return the actual data. The total current number of outstanding or pending I/O redirection requests can denote a total number of redirection requests for which a non-owner node has sent a redirection request to the owner node but not yet received a reply.

In at least one embodiment, the one or more criteria can include a fifth condition that specifies if the I/O latency or I/O response time within the storage system exceeds a maximum threshold, then the owner node can return the other information in the redirection reply, and otherwise can return the actual data. In at least one embodiment, the I/O latency or I/O response time for a single I/O requests can denote the amount of time it takes from when the I/O request is received at the storage system to when a response or reply to the I/O request is sent from the storage system to the storage client that issued the I/O request. In at least one embodiment, the I/O latency or I/O response time metric used can denote an average I/O latency or response time observed or measured in a storage system with respect to I/Os in the storage system over a defined period of time.

In at least one embodiment, the one or more criteria can include a sixth condition that specifies if the redirection request latency or response time within the storage system exceeds a maximum threshold, then the owner node can return the other information in the redirection reply, and otherwise can return the actual data. In at least one embodiment, the redirection latency or response time for a single redirection request can denote the amount of time it takes from a starting point when the redirection request is sent by the non-owner node to the owner node to an ending point when the non-owner node receives a corresponding redirection reply from the owner node. In at least one embodiment, the redirection request latency or response time metric used in can denote an average redirection request latency or response time observed or measured in a storage system with respect to redirection requests and associated replies within a defined period of time.

In at least one embodiment, the one or more criteria can include any one or more of the above-noted or other conditions discussed in this disclosure, alone or in combination with one or more other suitable conditions, used to evaluate the current load and level of busy-ness of the interconnect between the nodes. In at least one embodiment including multiple conditions in the criteria, if any one of the conditions evaluates to true, such as any one or more of the above-noted or other conditions evaluates to true to indicate that the interconnect is overloaded, then the other information can be returned in the redirection reply rather than the actual data; and otherwise the actual data can be returned in the redirection reply. As a variation in at least one embodiment where the criteria includes multiple conditions (such as at least two of the above-noted or other conditions), then the other information rather than the actual data can be returned in the redirection reply if at least N of the conditions evaluates to true to indicate that the interconnect is overloaded, where N can generally by any integer greater than 0 up to the total number of conditions included in the criteria. In at least one embodiment, a weighting of the various multiple conditions can be combined to determine a final value that can be used to determine whether to return the actual data in the redirection reply or whether to return the other information, including the physical location or address information of the data, in the redirection reply. For example, an equation can include a number of added terms, where each term relates to one condition of the criteria and an associated weight. If the condition evaluates to true, then the condition's associated weight can be included in the final value. To further illustrate, assume there are 3 conditions CON1, CON2, CON3 included in the criteria with associated corresponding weights W1, W2 and W3. W1, W2 and W3 can be any suitable value used to denote the relative importance of the 3 conditions. An equation expressed as:
TOTAL=(W1*CON1)+(W2*CON2)+(W3*CON3)

where W1, W2 and W3 are the corresponding weights, respectively, of the conditions CON1, CON2 and CON3 and where each of CON1, CON2 and CON3 in the equation evaluate to true or "1" if the condition is true and otherwise evaluate to false or "0". In this manner the TOTAL can be the sum of the weights of those conditions that evaluate to true or "1". If the TOTAL exceeds a specified threshold, then the interconnect can be deemed overloaded or busy such that the other information rather than the actual data is returned in the redirection reply; and otherwise the interconnect can be deemed not overloaded or not busy such that the actual data can be returned in the redirection reply.

In at least one embodiment, the interconnect or interconnection between the nodes can be as represented by element 120 in FIG. 2A. In at least one embodiment, the interconnect 120 can be a network connection used only for internode communication between the connected nodes 102a-b. In at least one embodiment in accordance with the techniques of the present disclosure, the interconnect between the nodes can be used to send redirection requests and replies between the nodes.

The foregoing and other aspects of the techniques of the present disclosure are described in more detail in the following paragraphs.

Figure 6:
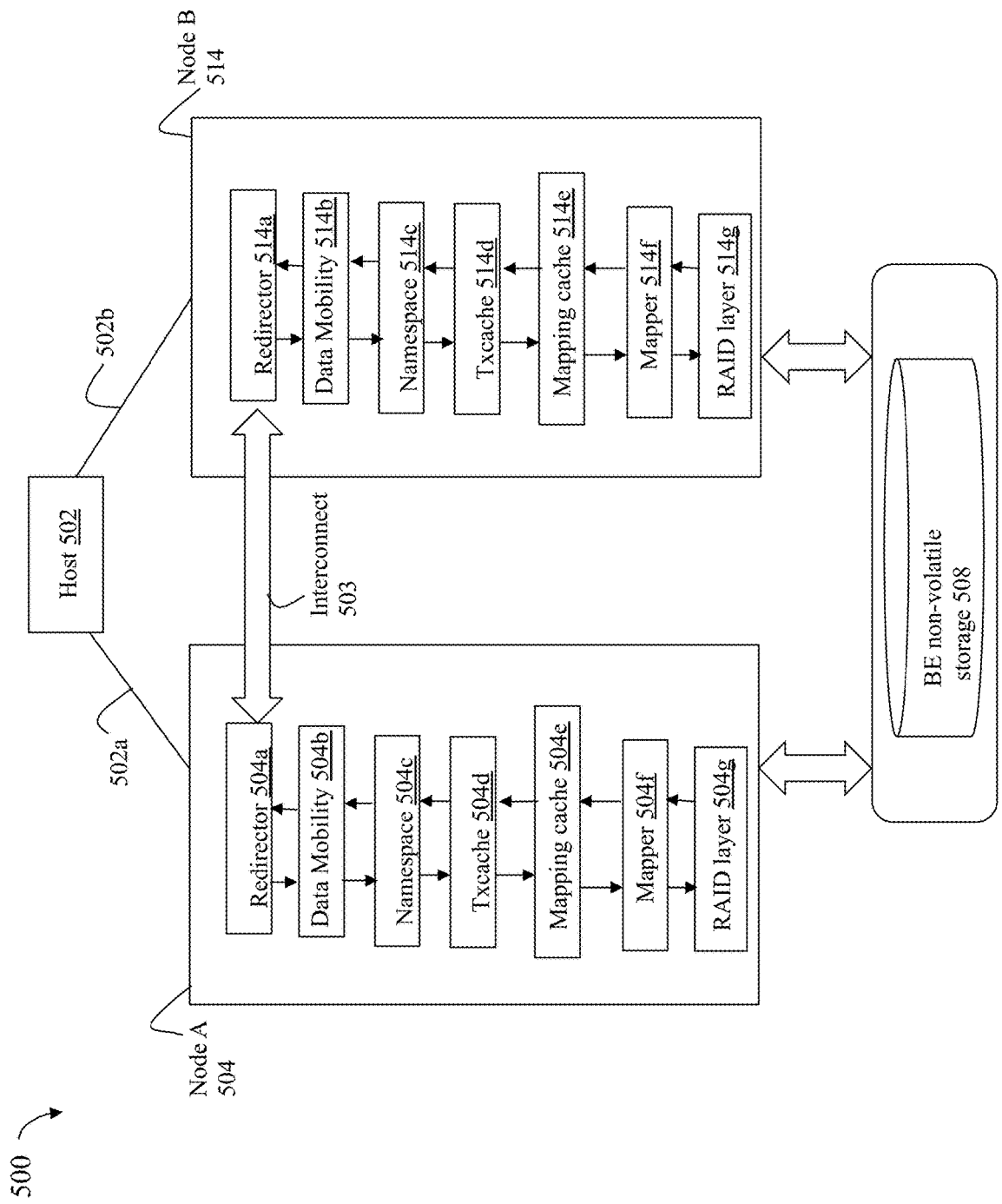
FIGS. 6 and 8 are examples of components and associated data flow in at least one embodiment in accordance with the techniques of the present disclosure.

Referring to FIG. 6, shown is an example 500 of components and associated data flow in at least one embodiment in accordance with the techniques of the present disclosure.

The example 500 illustrates a host 502 and various layers and components on the nodes 504, 514 in connection with data flow when servicing I/Os in at least one embodiment in accordance with the techniques of the present disclosure. The host 502 can be connected to the storage system including the node A 504 and the node B 514 such as described, for example, generally in FIG. 2A. The host 502 can be connected to node A 504 over one or more paths or connections 502a. The host 502 can be connected node B 514 over one or more paths or connections 502b. In at least one embodiment, the host and storage system with nodes 504, 514 can be configured in an active-active or AO-AO configuration such that the host 502 can issue commands or I/O operations to exposed volumes or LUNs over the paths 502a-b to both nodes. Also in at least one embodiment, a logical address ownership scheme can be deployed between the nodes. For example, in at least one embodiment, ownership of each volume or LUN can be assigned to a single one of the nodes A and B such that the owning or owner node of a volume owns all logical addresses of the volume. As also discussed elsewhere, other arrangements or partitioning of the logical address spaces of the volumes can be used with the techniques of the present disclosure although the following paragraphs can make particular reference to a per volume ownership assignment among the nodes such that each volume is owned exclusively by a single one of the nodes 504, 514.

In at least one embodiment, the node A 504 can include the following layers or components of the data path or I/O path: redirector 504a, data mobility 504b, namespace 504c, Txcache (transactional cache) 504d, mapping cache 504e, mapper 504f, and RAID layer 504g. In at least one embodiment, the node B 514 can include layers or components similar to those of node A 504. In at least one embodiment, the node B 514 can include the following layers or components of the data path or I/O path: redirector 514a, data mobility 514b, namespace 514c, Txcache 514d, mapping cache 514e, mapper 514f, and RAID layer 514g The redirector component or layer (sometimes referred to as simply redirector) 504a, 514a can perform processing including redirecting or forwarding I/Os from a non-owner node (also an initiator for the I/O) to an owner peer node over the interconnect 503 between the nodes, and then receiving a corresponding response or reply sent from the owner node to the non-owner initiator node over the interconnect 503 between the nodes. The redirector 504a, 514a can use logical address ownership information to determine whether a node that receives and I/O operation or request directed to a target logical address is the owner of the target logical address. For example, in at least one embodiment, the logical address ownership information can be a table or other structure identifying the assigned node owner of each volume or LUN such that when an I/O directed to a logical address LA1 is received by a node 504, 514, the redirector 504a, 514a of the receiving node can determine whether LA1 is owned by the receiving node (and thus where the I/O can be serviced by the receiving node), or whether the receiving node is not the owner of LA1 (and thus where the redirector 504a, 514a redirects the I/O to the owning peer node over the interconnect 503.

The data mobility layer or service 504b, 514b can perform various operations related to data mobility such as related to snapshots, clones, and the like.

The namespace component or layer 504c, 514c (sometimes referred to as simply namespace) in at least one embodiment can be a logical volume manager providing interfaces for reading and writing data from volumes, snapshots, and the like. The namespace 504c, 514c can include, for example, logical addresses of volumes or LUNs storing client content. Consistent with other discussion herein, the logical addresses can be expressed using a volume or LUN identifier and LBA or offset. A logical address of the namespace 504c, 514c can be included, for example, in read I/O operations and write I/O operations issued by storage clients to a data storage system. In at least one embodiment, the storage clients can include external storage clients which are external with respect to the data storage system. In at least one embodiment, the storage clients can include one or more hosts such as described elsewhere herein (e.g., FIG. 1).

The transactional cache (Txcache) layer or component 504d, 514d (sometimes referred to as simply Txcache or user data (UD) cache) can handle caching of user or storage client data in a cache of node. In at least one embodiment, the Txcache can include cached client content or data stored in node-local non-volatile memory used as a node-local cache. In at least one embodiment, the Txcache 504d, 514d can cache user data or content stored at corresponding logical addresses. Thus, the Txcache 504d, 514d can be a table or other structure of entries organized or accessed using keys which are logical addresses (e.g., volume or LUN ID and LBA or offset) to access corresponding cached data or content stored at the mapped logical addresses.

The mapper or mapping layer 504f, 514f can include mapping information used to map a logical address LA1 of user data to a corresponding physical address or location PA1 where the user data is stored on non-volatile storage. Consistent with other discussion herein in at least one embodiment using a log-based or log structured system (LSS), each time there is an overwrite of the same logical address LA1, the newly written content can be written persistently to a user data log, and then an acknowledgement can be returned to the host or other client regarding completion of the write. Subsequently, the log can be flushed where, each time LA1 is overwritten, the newly written user data is stored at a new physical location on BE non-volatile storage. Put another way, in an LSS, each overwrite of the same LA1 results in storing the newly written updated content at a new or different storage location (e.g., rather than overwriting or storing the updated content of LA1 at a same physical location as the prior content of LA1). In at least one embodiment, a logical address LA1, such as expressed using a logical device or LUN and LBA, can be mapped on the data storage system to a physical address or location PA1, where the physical address or location PA1 contains the content or data stored at the corresponding logical address LA1. Generally, mapping information or a mapper layer can be used to map the logical address LA1 to its corresponding physical address or location PA1 containing the content stored at the logical address LA1. In some embodiments, the mapping information or mapper layer of the data storage system used to map logical addresses to physical addresses can be characterized as metadata managed by the data storage system. In at least one embodiment, the mapping information or mapper layer can be a hierarchical arrangement of multiple mapper layers. Mapping LA1 to PA1 using the mapper layer can include traversing a chain of metadata pages in different mapping layers of the hierarchy, where a page in the chain can reference a next page, if any, in the chain. In some embodiments, the hierarchy of mapping layers can form a tree-like structure with the chain of metadata pages denoting a path in the hierarchy from a root or top level page to a leaf or bottom level page.

The mapper 504f, 514f can denote the mapping information including a hierarchy of metadata include MD pages and VLB pages described elsewhere herein, (e.g., FIGS. 2D-E, 3, 4, 5). Consistent with other discussion herein, the mapping information of the mapper 504f, 514f can include mapping information of chains of MD pages which map logical addresses to corresponding physical storage addresses or locations on the non-volatile BE storage 508, where such physical storage addresses or locations contain data or content stored at corresponding mapped logical addresses. In at least one embodiment, the various MD and VLB pages of the mapper 504f, 514f can be persistently stored on BE non-volatile storage.

The RAID layer 504g, 514g can perform RAID storage services or operations such as in at least one embodiment where the BE non-volatile storage 508 includes storage configured as one or more RAID (redundant array of independent disks or devices) groups. The RAID layer 504g, 514g can provide an interface to accessing content stored at a physical address or location on BE non-volatile storage 508 organized as a RAID group.

The mapping cache 504e, 514e is a layer which can be used in embodiments in accordance with the techniques of the present disclosure to by-pass other layers of the illustrated data flow in connection with I/O flows such as for read I/Os. The mapping cache 504e, 514e includes cached page descriptors (sometimes referred to as descriptors) which in at least one embodiment are stored in a form of volatile fast memory, such as a form of RAM memory. The descriptors of the mapping cache 504e, 514e can be indexed, accessed and organized using keys which are logical addresses (e.g., volume or LUN ID and LBA or offset) and where the cached content or values are the cached page descriptors for corresponding logical addresses. Processing can map a logical address to a corresponding descriptor, if such descriptor is stored in the mapping cache 504e, 514e.

It should be noted that not all the layers or components in the illustrated runtime call stack or chains of the nodes 504, 514 may be traversed for each I/O or other command, request or operation performed. Rather, the runtime processing may only proceed down the runtime stack illustrated as far as needed for the particular I/O or other command being serviced. Additionally, although not illustrated, runtime processing can include other interactions and calls made between various components and layers. For example, as discussed in more detail in following paragraphs, if node B 514 receives a read I/O directed to a logical address owned by node B, node B can service the read I/O. The requested read data may be stored in the Txcache 514d so there is no reason for the other layers 514e-g to be invoked in this particular runtime call stack to service the read I/O. In this case, processing for servicing the particular read I/O may proceed as follows: 514a, 514b, 514c, and 514d, and then return up the stack in reverse order (e.g., 514s, 514c, 514b and 514a), where the cached content of the logical address as stored in the Txcache 514d can be returned up the call stack to 514a and returned to the host 502.

Figure 7A:
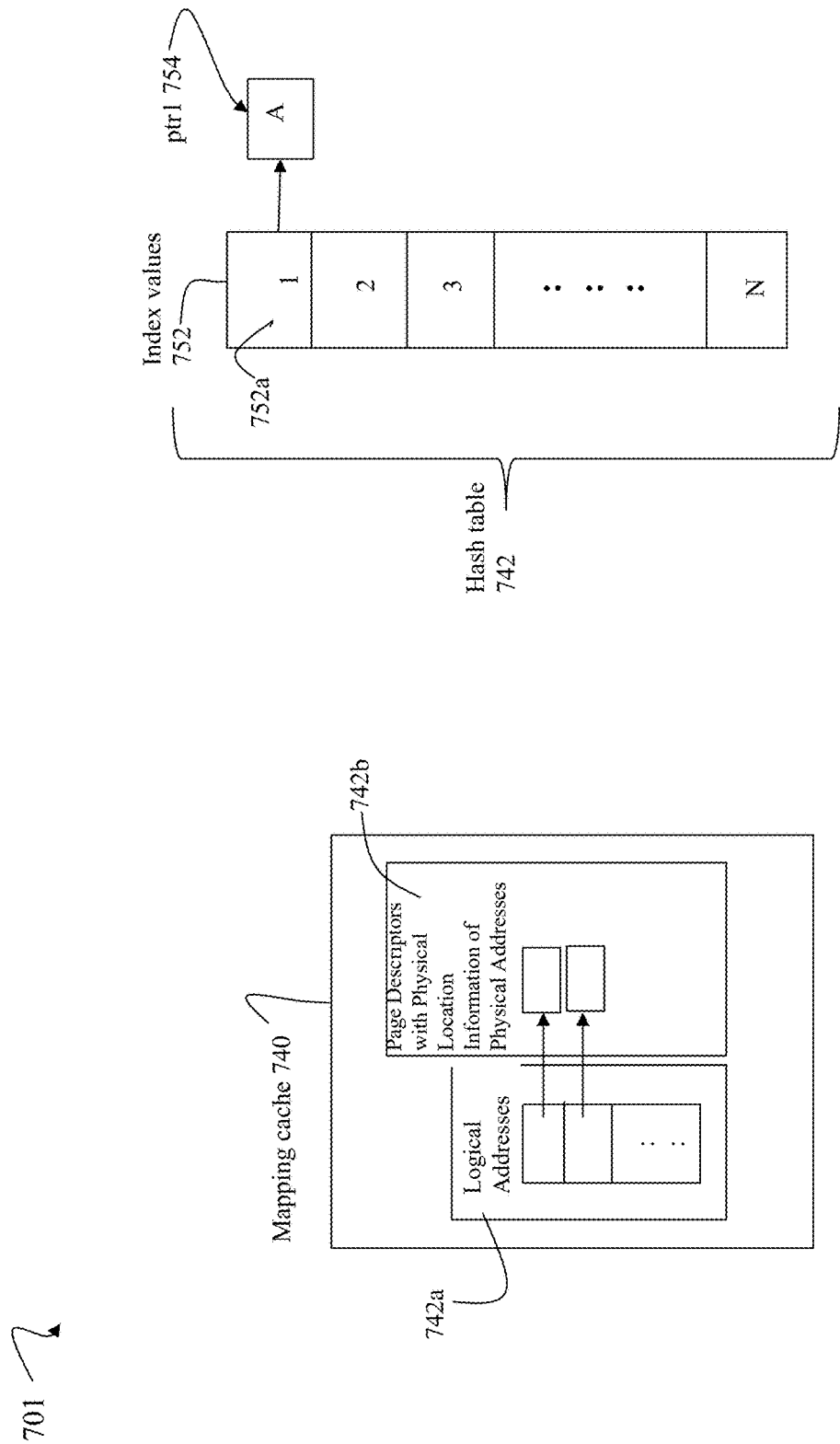
FIGS. 7A and 7B are examples of structures that can be used in implementing the mapping cache in at least one embodiment in accordance with the techniques of the present disclosure.

With reference to the example 701 of FIG. 7A, in at least one embodiment as illustrated by element 740, the mapping cache 740 can be implemented using a hash table HT 742 with entries or indices. A logical address 742a can be mapped, such as using a hash function F, to an entry or index j of the hash table 742, denoted as HT(j), where HT(j) is associated with or includes one or more page descriptors 742b each with a corresponding logical address mapped by F to HT(j). Each of the cached page descriptors 742b can include multiple fields of information related to the mapped logical address. One of the fields of information of each cached page descriptor 742b is physical location information of a physical address or storage location on the non-volatile BE storage containing content stored at a corresponding logical address 742a. Thus the mapping cache 740 does not store the actual content or data of a corresponding logical address 742a but rather stores a corresponding descriptor 742b which further includes the physical address or location of content stored at the corresponding logical address. In this manner in at least one embodiment, the descriptor 742b can be used to directly access the actual content or data of a corresponding logical address 742a bypassing other layers, such as bypassing the mapper layer 504f, 514f of a node. In at least one embodiment, when a read I/O (or redirected read I/O) requesting to read content stored at a logical address LA is received by an owner node of a data storage system, the mapping cache 504e, 514e of the owner node can be queried to determine whether it includes a corresponding cached descriptor for LA. If so, a hit is determined with respect to the mapping cache 504e, 514e and the physical address or location information of the cached descriptor can be used to read the requested read data from the non-volatile BE storage. As discussed in more detail elsewhere herein, the cached descriptor for the LA can also include other information relevant to the LA and its stored content. In at least one embodiment, the descriptor can include a hash value, such as a cryptographic hash value, which can be used to validate the returned content.

In the example 701, the hash table 742 provides further detail illustrating one representation of the structure of the mapping cache in at least one embodiment.

Element 752 denotes the index values for the hash table 742, where the index values range from 1 to N. Consistent with other discussion herein, logical addresses 742a used as keys or key value can be mapped, such as by a hash function F, to one of the N index values 752. For example, a logical address LA can be mapped to index 1 752a, where the descriptor A is included in the linked list or bucket of descriptors associated with index 1 752a. Ptr1 754 is a pointer to the head of the linked list or bucket of descriptors associated with index 1. In at least one embodiment, descriptors can be added to the head or front of the linked list of descriptors associated with each index. More generally, descriptors can be added to the head or tail of the list of descriptors.

Additional detail regarding the mapping cache 504e, 514e and its use in connection with the techniques of the present disclosure are described in more detail elsewhere herein.

In at least one embodiment, each descriptor stored in the mapping cache can be associated with only a single hash table entry or index. In at least one embodiment, each hash table entry or index j, HT(j), can generally be associated with one or more descriptors each having a corresponding logical address LA which is mapped to the entry or index j by a hash function or algorithm F, where F(LA)=j. In at least one embodiment, each hash table entry or index HT(j) can be associated with a linked list of descriptors which are mapped to HT(j). In at least one embodiment, the linked list associated with each HT(j) can be implemented as a singly linked list using next pointers, where each linked list entry can include a next pointer to its immediately next linked list entry, if any. Thus, the HT(j) linked list can be characterized in one aspect as a bucket of one or more descriptors mapped to HT(j) by F. In at least one embodiment, a head pointer, such as ptr1 754 of FIG. 7A can be maintained for each HT(j) bucket or linked list where a descriptor added to the entry HT(j) can be added to the head of the descriptor list associated with HT(j).

In at least one embodiment, all the in use descriptors stored in the mapping cache can collectively be organized as an LRU (least recently used) list or queue of descriptors. The LRU queue can be used in connection with overall management, including an eviction policy, for all descriptors cached in the mapping cache. In at least one embodiment, the eviction policy can be an LRU-based policy.

Figure 7B:
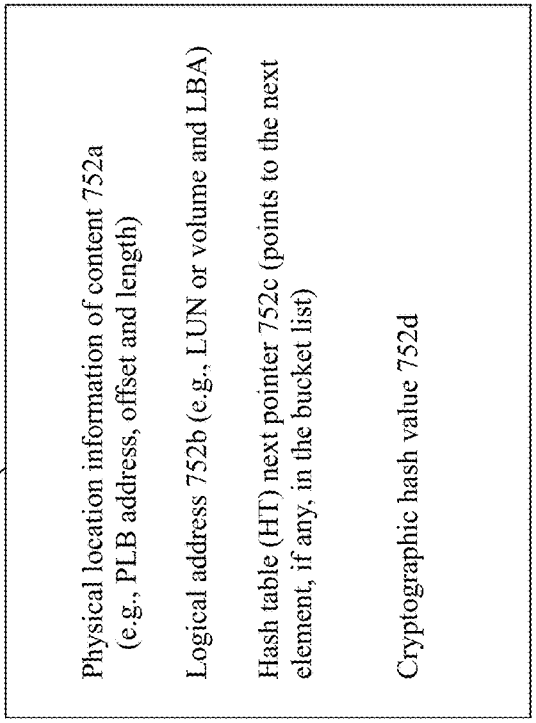

Referring to FIG. 7B, shown is an example 750 identifying information that can be included in each page descriptor in at least one embodiment in accordance with the techniques of the present disclosure.

The example 750 indicates that each page descriptor 752 can include the following fields of information:

Physical location information of content 752a: The field 752a identifies a reference, address or pointer to physical location containing content stored at a corresponding logical address denoted by 752b of the same descriptor. In at least one embodiment, the field 752a can identify a PLB (physical large block) address as well as an offset and length. The offset and length can denote the physical location of the content within the PLB having the PLB address. The physical location of the content can have a starting location denoted by the "offset" within the PLB (pointed to by the PLB address) and a size or length denoted by the "length" of 752a. Thus the content can have a starting offset denoted by "offset" and an ending offset denoted by "offset+length".

In at least one embodiment, BE non-volatile storage can be partitioned into logical segments or PLBs (physical large blocks). Typically in at least one embodiment, a PLB can store multiple stored data items such that stored data or content can be stored at a range of offsets in a single PLB. In one embodiment using PLBs, the read data can be stored in a PLB such that the read data can be identified using 1) an address of a PLB; 2) a starting offset within the PLB for the read data; and 3) a length denoting a size of the read data. Thus, the read data can be stored at physical storage locations spanning from a beginning address to an ending address, where the beginning address=the PLB address+ starting offset, and where the ending address=PLB address+ starting offset+length.

Logical address 752b: This is the logical address corresponding to the descriptor 752. The physical location information 752a of the descriptor 752 includes the reference, pointer or address of the physical location containing content stored at the logical address 752b. In at least one embodiment, the logical address 752b can be expressed using a LUN or volume and an LBA or logical offset within the LUN or volume's logical address space.

Hash table pointer 752c: This pointer is used to link the descriptor 752 into a bucket or linked list of descriptors associated with one of the hash table entries or indices, j, where LA1 denotes the logical address 752b that is mapped to j in accordance with a hash function or algorithm F (e.g., F(LA1)=j). The pointer 752c can point to the next descriptor, if any, in the bucket or singly linked list of descriptors selected for storing this particular descriptor 752. In at least one embodiment, the descriptor 752 can be added to the head of the bucket or linked list associated with hash table index j.

Cryptographic hash value 752d: The cryptographic hash value 752d is computed using a cryptographic hash function or algorithm for the content or user data stored at the physical location represented by the physical location information 752a of the descriptor 752. Consistent with other discussion herein, the cryptographic hash value 752d, along with other information of 752, can be determined and stored in the new descriptor as part of initializing or updating the descriptor to include information associated with the I/O operation triggering the new descriptor request. Thus, the cryptographic hash value 752d, along with other information of 752, can be determined and stored in the descriptor 752 when adding the descriptor 752 to the hash table of the mapping cache. As discussed elsewhere herein, the cryptographic hash value 752d can be used in connection with validation processing for content obtained using the physical location information 752a in a subsequent hit or reference to the descriptor 752. The subsequent hit or reference can be, for example, in connection with a subsequent read I/O resulting in a hit of the hash table of the mapping cache, where the hit references the descriptor 752.

In at least one embodiment, the content or data stored at the physical location 752a can be compressed and stored in its compressed form in the physical location 752a. In such an embodiment, the cryptographic hash value 752d can be computed or determined using a cryptographic hash function or algorithm applied to the uncompressed or original form of the content.

Figure 8:
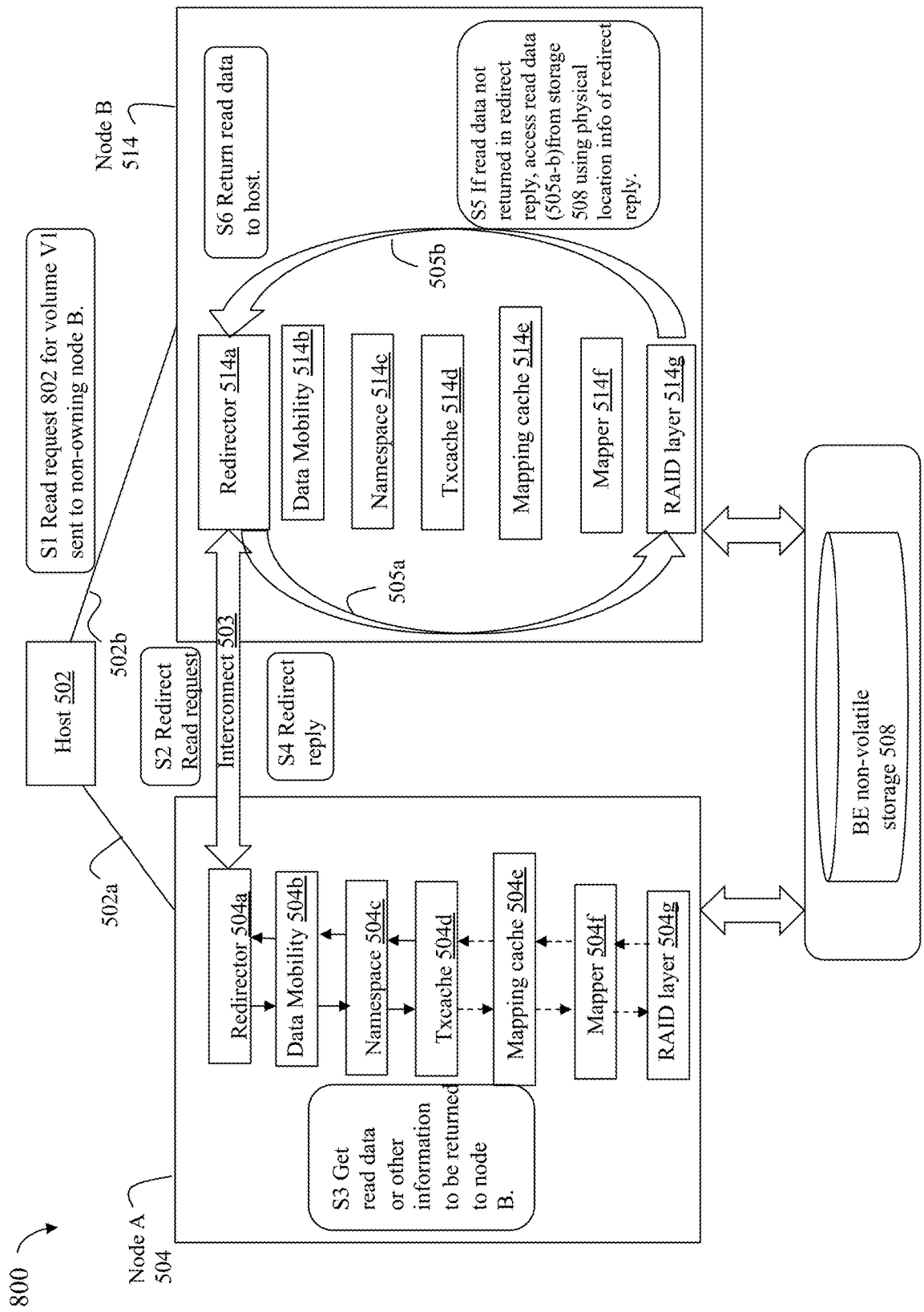

What will now be described with reference to FIG. 8 is an example illustrating use of the techniques of the present disclosure in at least one embodiment in which a read I/O request is directed to a target logical address LA1, where LA1 is an LBA or offset on volume or LUN V1. In the example 800 of FIG. 8, the layers or components are as described, for example, in connection with FIG. 6. Assume that the read I/O request directed to LA1 of volume V1 is sent in a step S1 to the non-owning node B. Thus in this example, node A owns LA1, or more generally, node A owns volume V1 and its logical address space.

Node B 514 receives the read I/O request of S1 and the redirector 514a of node B 514 determines that node B is not the owner of LA1 and not the owner of volume V1. Rather, the redirector 514a determines that node A 504 is the owner of LA1 and volume V1. The redirector 514a sends a redirect or redirection request (S2) over the interconnect 503 to the owning node. The redirection request of S2 is a redirection request of the read I/O sent in S1 to node B.

In at least one embodiment, a redirection request sent from a non-owner node to an owner node can include sufficient information about the redirected I/O request to be performed by the owner node. In at least one embodiment, the redirection request can include information identifying the type of I/O operation or request as a read or write, and can include at least the target logical address of the redirected I/O operation.

The redirector 504a of node A 504 can receive the redirection request S2 of the read I/O directed to LA1 of volume V1. In response to receiving the redirection request of the read I/O, the node A 504 can generally perform processing in a step S3 to service the read I/O and return to node B either the actual requested read data, or alternatively other information, including physical location information, that can be used by node B to read the requested data from BE non-volatile storage 508.

The various layers or components of the data path runtime call stack 504a-d are illustrated with solid lines/arrows therebetween to denote that the runtime call stack for processing this redirected read I/O includes at least 504a-d. The layers or components 504d-g are illustrated with dashed lines/arrows therebetween to denote that the runtime call stack for processing this redirected read I/O can conditionally include any of 504e-g depending on the runtime evaluation or state of the Txcache 504d, mapping cache 504e and a determination of whether the interconnect 503 is currently overloaded or busy. In at least one embodiment, a determination of whether the interconnect 503 is overloaded or busy can be based, at least in part, on one or more criteria used to evaluate the current load, utilization or level of busyness of the interconnect 503. More generally, a policy decision can be made to determine whether to return in the redirection reply the larger sized actual read data or content, or whether to return in the redirection reply a smaller sized reply of other information including physical location information that be used by the non-owner node B to read the requested read data from BE non-volatile storage 508. In at least one embodiment, the policy can include the one or more criteria comprising one or more conditions evaluated to determine whether the interconnect 503 is overloaded such that the smaller sized reply of other information should be returned rather than the larger sized actual read data or content. Generally, if based on the one or more criteria, it is determined that the interconnect 503 is overloaded or overutilized, then the smaller sized reply of other information is returned rather than the larger sized actual read data or content. Alternatively, if based on the one or more criteria it is determined that the interconnect 503 is not overloaded or overutilized, then the larger sized actual read data or content can be returned rather the smaller sized reply of other information. Examples of conditions and metrics that can be included in the one or more criteria are described in more detail elsewhere herein.

The step S3 processing performed by the owning node A 504 can include a substep S3a where node A 504 determines whether there is a cache hit in the Txcache 504d for LA1. If there is a cache hit in the Txcache 504d for LA1, the Txcache 504d is currently caching the data or content C1 stored at LA1. If there is a cache hit in the Txcache 504d for LA1, the requested read data or content C1 of the Txcache 504d can be returned by the redirector 504a in the redirect reply S4 over the interconnect to 503 from node A to node B. In at least one embodiment, step S3a can further include an additional evaluation of whether, based on the one or more criteria, the interconnect 503 is overloaded. If the step S3a determines a cache hit in the Txcache 504b for LA1 (where C1 is cached in the Txcache 504b) and the one or more criteria determine that the interconnect is not overloaded or not busy, then the requested read data or content C1 of the Txcache 504d can be returned by the redirector 504a in the redirect reply S4 over the interconnect to 503 from node A to node B. Otherwise in at least one embodiment if the criteria determine that the interconnect is overloaded or busy, the requested read data or content C1 of the Txcache 504d is not be returned by the redirector 504a in the redirect reply S4 over the interconnect to 503 from node A to node B even though there is a cache hit in the Txcache 504d for LA1.

Following the substep S3a of S3 is a substep S3b of S3. The step S3b can be performed if the step S3a did not result in determining that the requested read data or content C1 is to be included the redirection reply. In the substep S3b, a determination is made as to whether the mapping cache 504e includes a corresponding descriptor for LA1 such that there is a cache hit in the mapping cache 504*e* for LA1. The substep S3*b* can include performing a mapping cache lookup in the mapping cache 504*e* for LA1 to determine or query whether the mapping cache 504*d* includes a corresponding descriptor for LA1. If there is a descriptor in the mapping cache 504*d* for LA1, then there is a mapping cache hit for LA1; and otherwise if there is no descriptor for LA1 in the mapping cache 504*e*, there is deemed a mapping cache miss for LA1.

Performing a lookup or query of a mapping cache such as mapping cache 504*e* can include mapping LA1 to a corresponding index j of the hash table of the mapping cache 504*e*. The hash table index j can be determined using a hash function F where F(LA1)=j. Processing can include determining whether the hash table index j includes a descriptor D1 with a stored logical address SA1 matching LA1. The bucket or linked list of descriptors associated with hash table index j can be traversed to determine whether the list includes a descriptor with a stored logical address SA1 matching A1. If there is such a matching descriptor D1, a hit is determined with respect to the hash table of the mapping cache for LA1. Otherwise if there is no such matching descriptor D1, a miss is determined with respect to the hash table of the mapping cache for LA1. In at least one embodiment, if the substep S3*b* determines a mapping cache hit for LA1 in the mapping cache 504*e*, the other information including the physical location information (752*a*) and hash value (752*d*) of the matching descriptor D1 can be returned in the redirection reply to node B. Otherwise, if the substep S3*b* determines a cache miss of the mapping cache 504*e* for LA1, then the substep S3*c* can be performed.

In the substep S3*c*, the mapper layer 504*f* can use the mapping information of the chain of MD pages and traverse the chain of MD pages (from MD top, mid, leaf and VLB pages) to map LA1 to its corresponding physical location PA1 including the content C1 stored at LA1. PA1 can correspond to, and be identified using, the physical location information of any cached descriptor of the mapping cache 504*e* for LA1. Thus using the chain of MD pages of mapping information, PA1 or more generally physical location information, of where C1 is stored on non-volatile BE storage can be obtained and included in the redirection reply returned over the interconnect to node B. In at least one embodiment, the other information returned in the redirection reply can include the physical location information of C1 for LA1, and also a hash value such as a cryptographic hash value for C1. The cryptographic or other hash value for C1 can be determined by applying a cryptographic or other suitable hash function CHF to C1. As discussed elsewhere herein, the foregoing hash value can be determined using the same cryptographic or other hash function CHF used to compute cryptographic or other hash values 752*d* of descriptors of the mapping cache 504*e*. As also discussed elsewhere herein, the foregoing hash value can be used in connection with data validation or verification of C1 read from BE non-volatile storage.

Thus, the step S3 can include performing the substep S3*a*. If substep S3*a* does not result in obtaining the requested read data or content C1 to be returned in the redirection reply, then the substep S3*b* can be performed. If the step S3*b* does not result in obtaining the other information, including at least the physical location information and hash value for C1, to be returned in the redirection reply, then the substep S3*c* can be performed.

In at least one embodiment, if the substep S3*c* is performed by node A 504, the substep S3*c* can include promoting or storing the content C1 in the Txcache 504*d*. In this case, an entry can be added to the Txcache 504*d* that maps the logical address LA1 to the cached content C1. Additionally, the substep S3*c* can include promoting the physical location information of C1 for LA1 into the mapping cache 504*c* by storing a corresponding descriptor D1 in the mapping cache 504*c* for LA1. Thus, as a result of performing the step S3 and one or more of its substeps 3*a*-3*c*, the node A 504 can determine whether to return the requested read data or content C1, or other information in the redirect or redirection reply over the interconnect 503 in a step S4. Additionally, the node A 504 can obtain either the content C1 or the other information to included in the indirection reply.

In at least one embodiment, the redirection reply or response of S4 can include the other information that can be used by the non-owner node to obtain the requested read data from BE non-volatile storage. In at least one embodiment, the other information can include physical location information identifying the physical address or location of the requested read data on the BE non-volatile storage. In at least one embodiment, the physical location information can include a pointer or address, and a length denoting the length or size of the read data. In at least one embodiment, BE non-volatile storage can be partitioned into logical segments or PLBs (physical large blocks). Typically in at least one embodiment, a PLB can store multiple stored data items such that stored data or content can be stored at a range of offsets in a single PLB. In one embodiment using PLBs, the read data can be stored in a PLB such that the read data can be identified using 1) an address of a PLB; 2) a starting offset within the PLB for the read data; and 3) a length denoting a size of the read data. Thus, the read data can be stored at physical storage locations spanning from a beginning address to an ending address, where the beginning address=the PLB address+starting offset, and where the ending address=PLB address+starting offset+length.

In at least one embodiment, the other information of the redirection reply can include hashing information such as a hash value of the data or content stored on BE non-volatile storage at the location identified by the location information. In at least one embodiment as discussed herein, the hash value can be a cryptographic hash value CHV where a cryptographic hash function CHF is used to determine the CHV based on the stored data or content. In at least one embodiment, the CHV or other hash value HV of the stored data or content can be based on the original data or content. In at least one embodiment, the CHV or HV generally can be used for data validation and verification by the non-owning node. For example, the non-owning node can read the content or data C1 from the BE non-volatile storage location identified by the location information, can compute a second hash value HV2 using the same CHF based on C1 as just read, and compare HV2 to the HV as included in the redirection reply. If HV2 and HV match, then the non-owner node can determine that the content C1 just read is valid and not corrupted, and otherwise that data validation of C1 has failed whereby C1 as just read is invalid and/or corrupted.

In at least one embodiment, content or data stored on BE non-volatile storage can be compressed and stored in its compressed form. In such an embodiment, the CHV or HV as stored in the descriptor of the mapping cache can be based on the original or uncompressed form of the content or data. In at least one embodiment where the content or data can be stored in its compressed form on BE non-volatile storage, the size of the location information can identify the size of the compressed form of the data or content stored on the BE non-volatile storage. In at least one embodiment storing the content C1 in its compressed form, the CHV or HV of C1 can generally can be used for data validation and verification by the non-owning node. For example, the non-owning node can read the compressed form of the content or data C1 from the BE non-volatile storage location identified by the location information, can decompress the content read to obtain the decompressed original content C1, can compute a second hash value HV2 using the same CHF based on the decompressed form or content C1, and compare HV2 to the HV as included in the redirection reply. If HV2 and HV match, then the non-owner node can determine that the content C1 is valid and not corrupted, and otherwise that data validation of C1 has failed whereby C1 as just read is invalid and/or corrupted.

In at least one embodiment in which per volume ownership of each volume is assigned to a single node, the other information returned in the redirection reply can include the LBA or offset of the target logical address of the read I/O for which the corresponding redirection request has been sent from the non-owning node. Put another way, the target logical address of the read I/O can be expressed using a target volume and LBA of the target volume, where the read I/O is received by a non-owning node that does not own the target volume such that the non-owning node issued a redirection request to the owner node of the target volume. In the redirection reply, the owner node can also include the LBA of the target volume (e.g., target LBA of the target logical address) in the other information of the redirection reply.

In at least one embodiment, the other information returned in the redirection reply can optionally include additional or different information than as described herein that can vary with embodiment. For example, if more than one compression/decompression algorithm or technique can be used to compress/decompress content stored on BE non-volatile storage, the other information can identify the particular compression/decompression algorithm or technique used.

In at least one embodiment, the other information of the redirection reply can include the location information and a hash value such as a CHV for the content stored on BE non-volatile storage at a location identified by the location information. In at least one embodiment, the other information can further include the target LBA or more generally identify the target logical address of the read I/O corresponding to the redirection request for which the redirection reply is being sent.

In at least one embodiment as discussed herein (e.g., FIGS. 6 and 8), each node can include a mapping cache and a Txcache (transactional user data (UD) cache). In at least one embodiment, the mapping cache of a node can be used to cache information about logical addresses owned by the node, where the node's mapping cache does not otherwise cache information about logical addresses not owned by the node or otherwise owned by the peer node. The mapping cache can be indexed, accessed or organized by user data logical addresses used as key values that are each mapped to a corresponding page descriptor of information about the mapped logical address. In at least one embodiment, the page descriptor mapped to or associated with a logical address can include physical location or address information as well as additional information, such as a hash value, about the associated logical address or its content. In at least one embodiment, the Txcache of a node can be used to cache content or data for logical addresses owned by the node, where the node's Txcache does not cache information about logical addresses not owned by the node. The Txcache can be indexed, accessed or organized by user data logical addresses used as key values that are each mapped to cached content or data stored at the mapped logical address.

In at least one embodiment, adding a new descriptor for a logical address, such as LA1, to the mapping cache, such as mapping cache 504c, can generally include allocating a new descriptor, updating the new descriptor to include information relevant for LA1 and its stored content C1, and placing the new descriptor on one of the bucket lists of descriptors associated with an index of the mapping cache that is mapped LA1. In at least one embodiment with reference to FIG. 7B, updating the new descriptor for LA1 having stored content C1 can include updating the physical location information 752a of the new descriptor to denote the physical location of C1 on non-volatile BE storage. The logical address 752b of the new descriptor can be updated to denote the logical address LA1 having content C1 stored at LA1. The cryptographic hash value, or other suitable hash value, for C1 can be computed using a cryptographic or other hash function or algorithm CHF applied to C1. The cryptographic or other hash value computed using CHF can be stored in field 752d of the new descriptor.

In at least one embodiment, the new descriptor for LA1 can be added to the hash table HT of the mapping cache 504e. The index j can be determined for LA1 using a hash function F, where F(LA1)=j, and the new descriptor is added to the bucket or linked list of descriptors associated with HT(j). The new descriptor can be added or linked to the bucket list of HT(j). The new descriptor can be added to the head or tail of the bucket list of descriptors associated with the index j depending on the particular embodiment. In at least one embodiment where each bucket list is a singly linked list, the new descriptor can be added to the head of the bucket list and accordingly update the hash table (HT) next pointer 752c of the new descriptor to point to the next descriptor, if any, of the bucket list of index j.

Referring back to FIG. 8, the redirect reply, including either the actual requested read data or content C1 or otherwise including the other information (comprising the physical location information for C1), can be returned over the interconnect 503 from node A 504 to node B 514. The redirector 504a of node A can send the redirect reply in the step S4 to the redirector 514a of node B over the interconnect 503. The redirector 514a of node B 514 can determine (in the step S5) if the redirect reply include the read data or content C1, or the other information. If the read data or content C1 is not returned in the redirect reply, the physical location information of the redirect reply can be used in the step S5 to access the read data (505a-b) from BE non-volatile storage 508. With reference to FIG. 8 in at least one embodiment in the step S5, the redirector 514a of node B can communicate directly (505a) with the RAID layer 514g to access C1 from storage 508 using the physical location information of the redirect reply received from node A. In response, the content C1 can be returned (505b) from the RAID layer 514g to the redirector 514a. Thus, accessing or reading C1 in the step S5 can be conditionally performed only if the redirect reply does not include C1 and rather includes the physical location information of where C1 is stored on the BE non-volatile storage 508.

Following the step S5, the step S6 can be performed to return the requested read data or content C1 to the host 502 that originally issued the read I/O operation of request in the prior step S1.

Figure 9A:
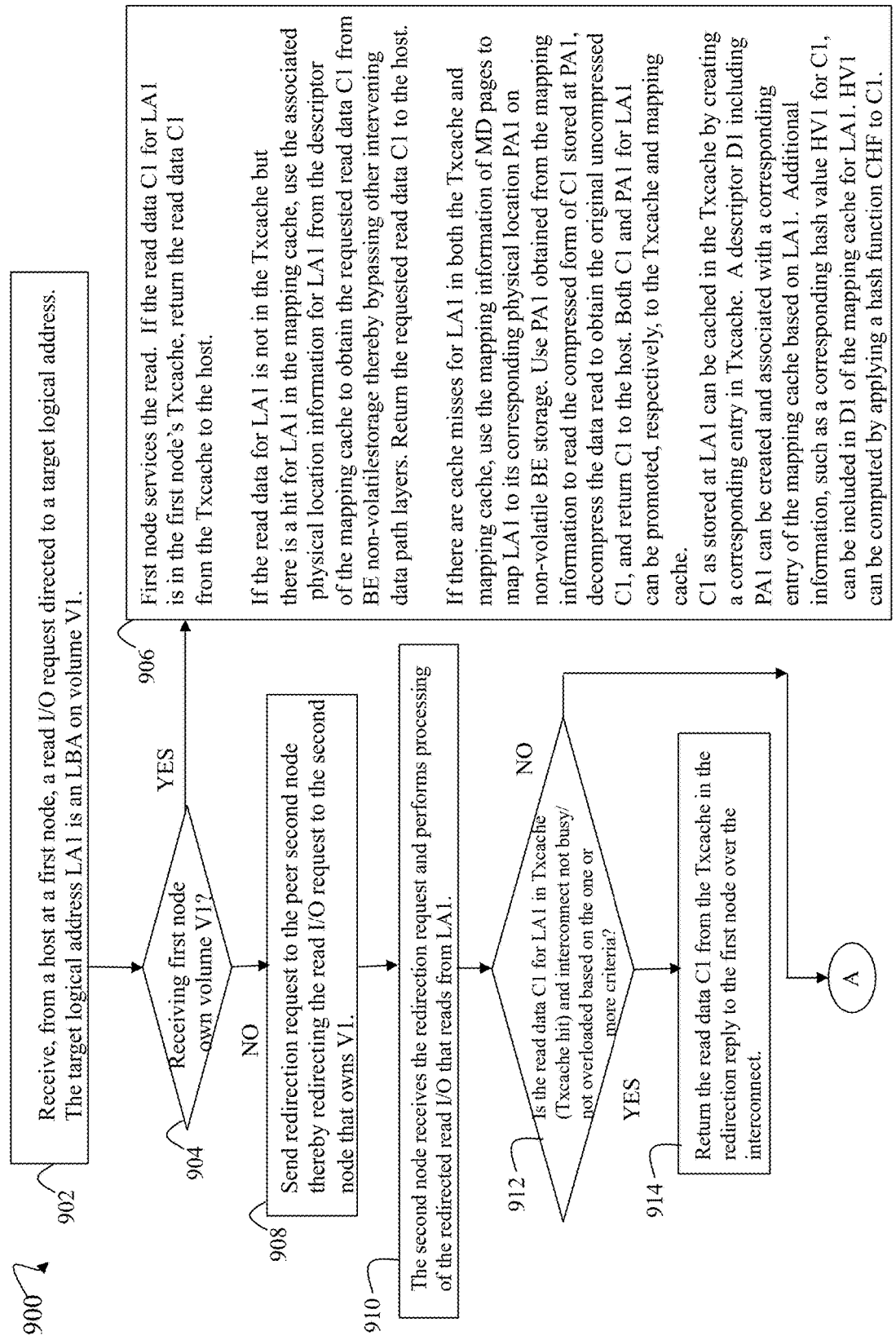
FIGS. 9A, 9B, 10 and 11 are flowcharts of processing steps that can be performed in at least one embodiment in accordance with the techniques of the present disclosure.
Figure 9B:
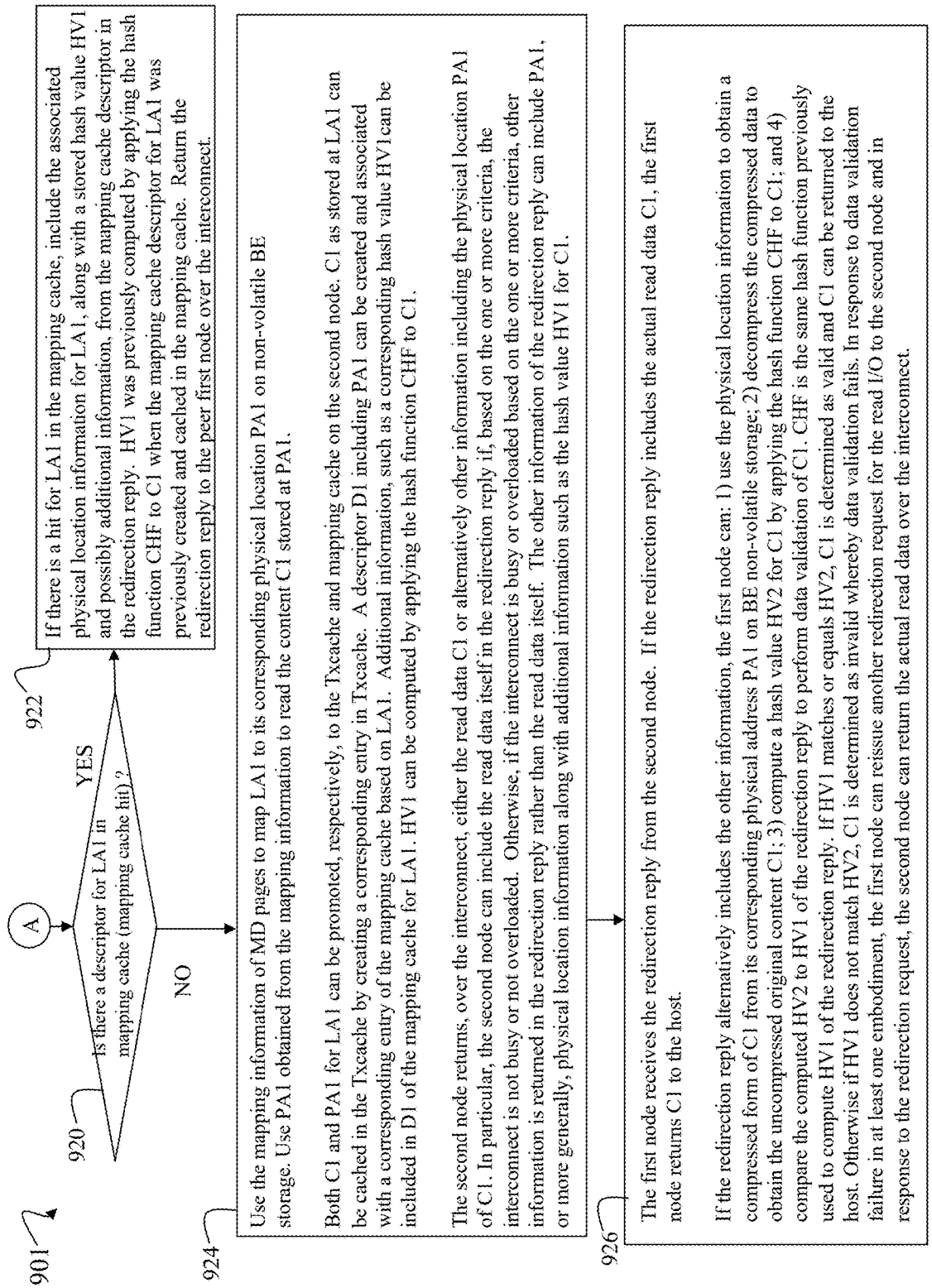

Referring to FIGS. 9A and 9B, shown is a flowchart 900, 901 of processing steps that can be performed in at least one embodiment in accordance with the techniques of the present disclosure in connection with processing a read I/O request. The FIGS. 9A and 9B summarize processing discussed above as performed when the read I/O is received by the non-owning node. Additionally, the FIGS. 9A and 9B describe processing that can be performed when the read I/O is received by the owning node directly from the host rather than via a redirection request.

At the step 902 A read I/O request directed to a target logical address is received from a host at a first node. The target logical address can be LA1 denoting an LBA or offset on volume V1. From the step 902, control proceeds to the step 904.

At the step 904, a determination is made as to whether the first node that received the read I/O owns the volume V1, or more generally, owns LA1. If the step 904 evaluates to yes, control proceeds to the step 906.

At the step 906, the first node services the read. If the read data C1 for LA1 is in the first node's Txcache (e.g., Txcache hit for LA1), the first node returns the read data C1 from the Txcache to the host in response to the read I/O. Otherwise, if the read data for LA1 is not in the Txcache (e.g., Txcache miss for LA1) but there is a cache hit for LA1 in the mapping cache, use the associated physical location information for LA1 from the mapped descriptor of the mapping cache to obtain the requested read data C1 from BE non-volatile storage thereby bypassing other intervening data path layers. The requested read data C1 can then be returned to the host in response to the read I/O.

In the step 906, if there are cache misses for LA1 in both the Txcache and mapping cache of the first node, use the mapping information of chain of MD pages to map LA1 to its corresponding physical location PA1 on non-volatile BE storage. Use PA1 obtained from the mapping information to read the compressed form of C1 stored at PA1, decompress the data read to obtain the original uncompressed C1, and return C1 to the host. Both C1 and PA1 for LA1 can be promoted, respectively, to the Txcache and mapping cache. C1 as stored at LA1 can be cached in the Txcache by creating a corresponding entry in Txcache that maps LA1 to the content C1 stored in the Txcache. A descriptor D1 including physical location information for PA1 can be created and associated with a corresponding entry of the mapping cache based on LA1. Additional information, such as a corresponding hash value HV1 for C1, can be included in D1 of the mapping cache for LA1. HV1 can be computed by applying a hash function CHF to C1.

If the step 904 evaluates to no, control proceeds to the step 908. At the step 908, a redirection request is sent from the first node to the peer second node that owns V1 and owns LA1. In this manner, the read I/O request received by the first node is redirected to the second node that owns V1 and LA1. From the step 908, control proceeds to the step 910.

At the step 910 the second node receives the redirection request and performs processing of the redirected read I/O that reads LA1. From the step 910, control proceeds to the step 912.

At the step 912, a determination is made as to whether the read data C1 for LA1 is in the Txcache of the second node (e.g., Txcache hit for LA1) and whether the interconnect is not overloaded or not busy based on the one or more criteria. If the step 912 evaluates to yes, control proceeds to the step 914. At the step 914, the read data C1 for LA1 as obtained from the Txcache can be returned in the redirection reply sent to the first node over the interconnect. Otherwise, if the step 912 evaluates to no, control proceeds to the step 920.

At the step 920, a determination is made as to whether there is a descriptor D1 for LA1 in the mapping cache of the second node (e.g., mapping cache hit for LA1). If the step 920 evaluates to yes, control proceeds to the step 922. At the step 922, if there is a hit for LA1 in the mapping cache, include the associated physical location information for LA1, along with a stored hash value HV1 and possibly additional information, from the mapping cache descriptor D1 in the redirection reply. HV1 was previously computed by applying the hash function CHF to C1 when the mapping cache descriptor for LA1 was previously created and cached in the mapping cache. The redirection reply, including the physical location information of C1 and the stored hash value HV1, can be sent to the peer first node over the interconnect.

If the step 920 evaluates to no, control proceeds to the step 924. At the step 924, the mapping information of MD pages can be used to map LA1 to its corresponding physical location PA1 on non-volatile BE storage. PA1 as obtained from the mapping information can be used to read the content C1 stored at PA1 from the BE non-volatile storage. In the step 920, both C1 and PA1 for LA1 can be promoted, respectively, to the Txcache and mapping cache on the second node. C1 as stored at LA1 can be cached in the Txcache by creating a corresponding entry in Txcache. A descriptor D1 including PA1 can be created and associated with a corresponding entry of the mapping cache based on LA1. Additional information, such as a corresponding hash value HV1 can be included in D1 of the mapping cache for LA1. HV1 can be computed by applying the hash function CHF to C1.

Also in the step 924, the second node returns, over the interconnect, either the read data C1 or alternatively other information including the physical location PA1 of C1. In particular, the second node can include the read data itself in the redirection reply if, based on the one or more criteria, the interconnect is not busy or not overloaded. Otherwise, if the interconnect is busy or overloaded based on the one or more criteria, other information is returned in the redirection reply rather than the read data itself. The other information of the redirection reply can include PA1, or more generally, physical location information along with additional information such as the hash value HV1 for C1. From the step 924, control proceeds to the step 926.

At the step 926, the first node receives the redirection reply from the second node. If the redirection reply includes the actual read data C1, the first node returns C1 to the host. If the redirection reply alternatively includes the other information, the first node can: 1) use the physical location information to obtain a compressed form of C1 from its corresponding physical address PA1 on BE non-volatile storage; 2) decompress the compressed data to obtain the uncompressed original content C1; 3) compute a hash value HV2 for C1 by applying the hash function CHF to C1; and 4) compare the computed HV2 to HV1 of the redirection reply to perform data validation of C1. CHF is the same hash function previously used to compute HV1 of the redirection reply. If HV1 matches or equals HV2, C1 is determined as valid and C1 can be returned to the host. Otherwise if HV1 does not match HV2, C1 is determined as invalid whereby data validation fails. In response to data validation failure in at least one embodiment, the first node can reissue another redirection request for the read I/O to the second node and in response to the redirection request, the second node can return the actual read data over the interconnect.

In at least one embodiment in an active-active configuration as described above, other commands, requests and/or operations besides read I/Os can be redirected to the owning node and processed locally by the owning node. For example, a write I/O directed to a logical address LA, where the write I/O is received by a non-owning node (e.g., that does not own LA1) can be redirected to the owning node for processing. In at least one embodiment, the other commands, requests and/or operations received by a non-owning node that can be redirected to the owning node can also include UNMAP commands, XCOPY (extended copy) commands (or more generally offload copy operations performed internally within the storage system where the source and destination of the copy are within the storage system), and snapshot commands.

Figure 10:
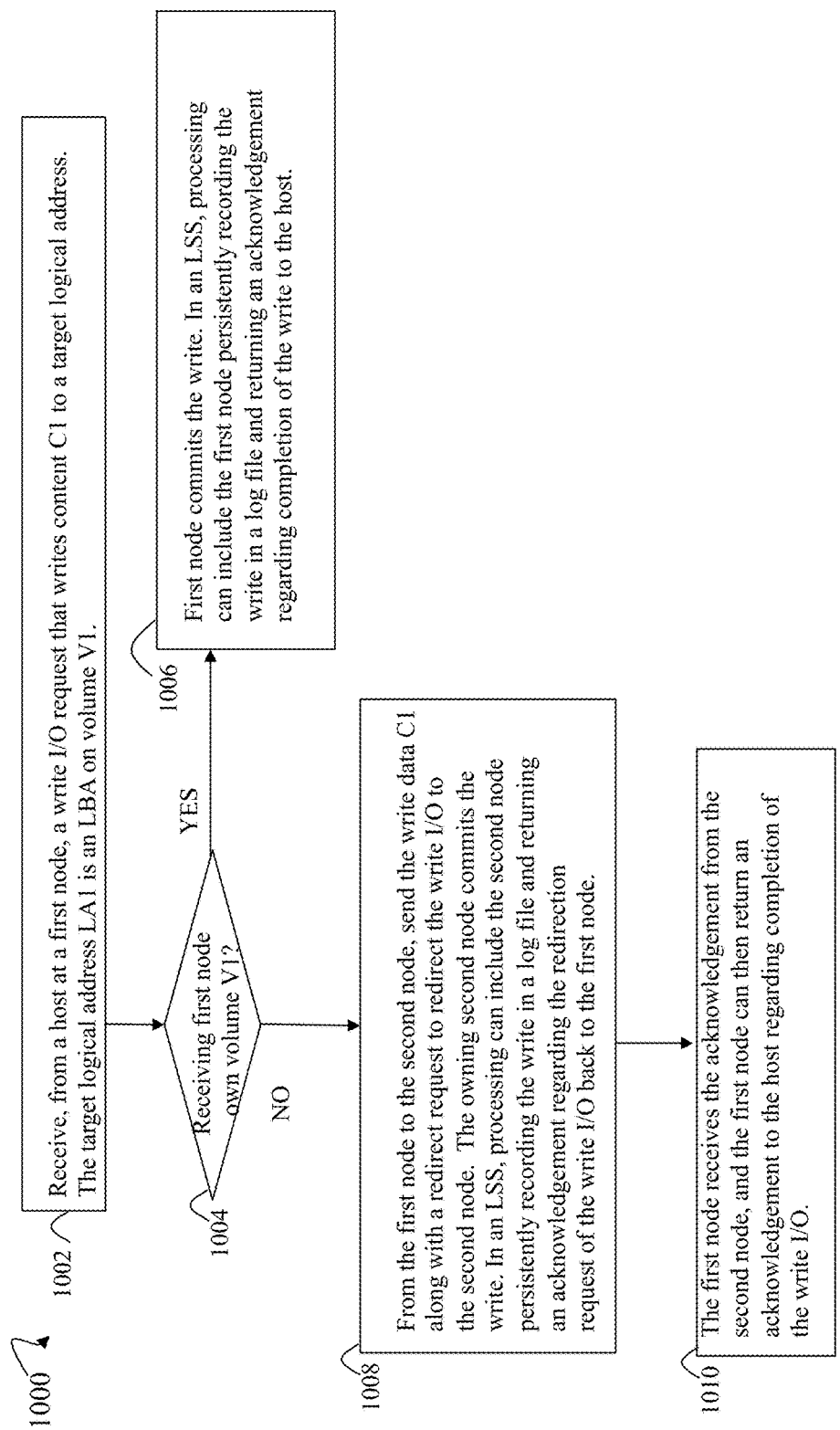

Referring to FIG. 10, shown is a flowchart 1000 of processing steps that can be performed in at least one embodiment in accordance with the techniques herein for processing write I/O operations. The write I/O operations can be received by both nodes in an active-active configuration such as described in connection with FIGS. 6 and 8 for read I/Os. Additionally, the flowchart 1000 describes processing that can be performed in an LSS as discussed elsewhere herein.

At the step 1002, a write I/O request is received from a host at a first node. The write I/O can write content C1 to a target logical address LA1 denoting an LBA or offset on volume V1. From the step 1002, control proceeds to the step 1004.

At the step 1004, a determination is made as to whether the receiving first node owns the volume V1 or more generally owns LA1. If the step 1004 evaluates to yes, control proceeds to the step 1006. At the step 1006, the first node commits the write. In an LSS, processing can include the first node persistently recording the write I/O in a log file and returning an acknowledgement regarding completion of the write to the host.

If the step 1004 evaluates to no, control proceeds to the step 1008. At the step 1008, from the first node to the second node, send the write data C1 along with a redirect request to redirect the write I/O to the second node over the interconnect. The owning second node commits the write. In an LSS, processing can include the second node persistently recording the write in a log file and returning an acknowledgement regarding the redirection request of the write I/O back to the first node.

In at least one embodiment, RDMA or remote direct memory access can be used to copy write data or content directly from memory of a non-owner node that receives a write I/O request to other memory of an owner node. The owner node will also receive from the non-owner node a redirection request for the write I/O. Accordingly, the owner node can service the write I/O of the redirection request using the write data or content sent via RDMA from the non-owner node. In such an embodiment, the redirection request and reply can be sent over the interconnect between the nodes while RDMA is used to send the write data or content C1 from the non-owner node to the owner node.

Figure 11:
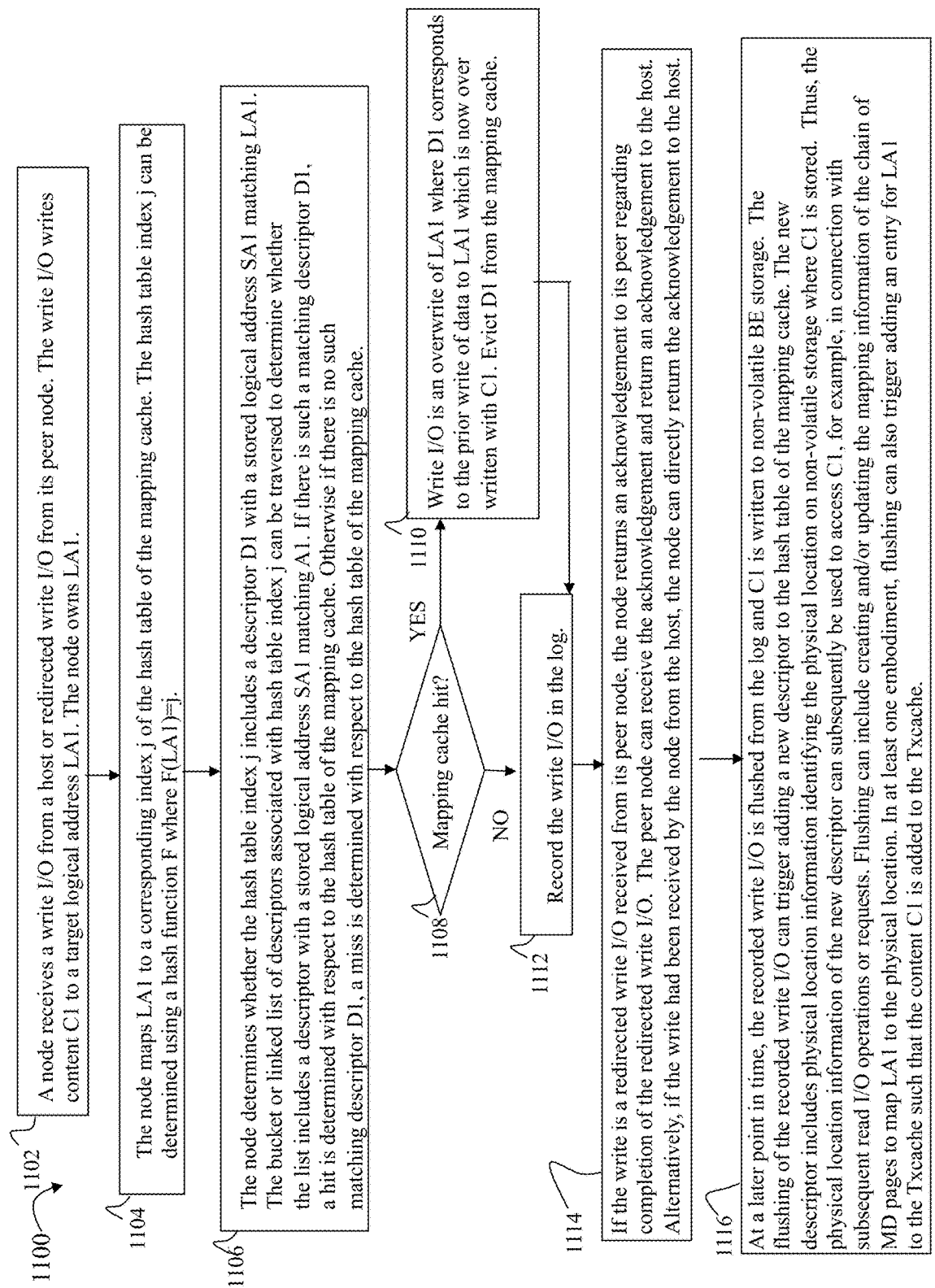

Referring to FIG. 11, shown is a flowchart 1100 of processing steps that can be performed in at least one embodiment in accordance with the techniques of the present disclosure. The flowchart 1100 provides further detail about processing of write I/Os in at least one embodiment in an LSS system.

At the step 1102, a node receives a write I/O from a host or a redirected write I/O from its peer. The write I/O writes content C1 to a target address LA1. The node owns LA1. From the step 1102, control proceeds to the step 1104.

At the step 1104, the node maps LA1 to a corresponding index j of the hash table of the mapping cache. The hash table index j can be determined using a hash function F where F(LA1)=j. From the step 1104, control proceeds to the step 1106.

At the step 1106, the node determines whether the hash table index j includes a descriptor D1 with a stored logical address SA1 matching LA1. The bucket or linked list of descriptors associated with hash table index j can be traversed to determine whether the list includes a descriptor with a stored logical address SA1 matching A1. If there is such a matching descriptor D1, a hit is determined for LA1 with respect to the hash table of the mapping cache. Otherwise if there is no such matching descriptor D1, a miss is determined for LA1 with respect to the hash table of the mapping cache. From the step 1106, control proceeds to the step 1108.

At the step 1108, a determination is made as to whether there is a mapping cache hit on the node for LA1. If the step 1108 evaluates to yes, control proceeds to the step 1010. At the step 1110, it is determined that the write I/O is an overwrite of LA1 where D1 corresponds to the prior write of data to LA1 which is now overwritten with content C1. In the step 1108, D1 is evicted or removed from the mapping cache. From the step 1108, control proceeds to the step 1112.

If the step 1108 evaluates to no, control proceeds directly to the step 1112. At the step 1112, processing is performed on the node to record the write I/O in the log. From the step 1112 control proceeds to the step 1114.

At the step 1114, if the write is a redirected write I/O received from its peer node (in the step 1102), the node returns an acknowledgement to its peer regarding completion of the redirected write I/O. The peer node can receive the acknowledgement and return an acknowledgement to the host. Alternatively, if the write had been received by the node directly from the host (in the step 1102), the node can directly return the acknowledgement to the host. From the step 1114, control proceeds to the step 1116.

At the step 1116, at a later point in time, the recorded write I/O is flushed from the log and C1 is written to non-volatile BE storage. The flushing of the recorded write I/O can trigger adding a new descriptor to the hash table of the mapping cache. The new descriptor includes physical location information identifying the physical location on non-volatile storage where C1 is stored. Thus, the physical location information of the new descriptor can subsequently be used to access C1, for example, in connection with subsequent read I/O operations or requests. Flushing can include creating and/or updating the mapping information of the chain of MD pages to map LA1 to the physical location. In at least one embodiment, flushing can also trigger adding an entry for LA1 to the Txcache such that the content C1 is added to the Txcache.

In connection with read I/Os, a buffer can be used to store the read data returned to the host. In connection with write I/Os, a buffer can be used to store the write data sent from the host. In at least one embodiment, other types of commands can be directed to or involve the use of a volume or LUN where such commands may not involve buffers used for storing content or data to be returned to a host, or storing content or data written by the host. In other words, such other types of commands may not involve the transfer or transmission of content or data between the storage system and an external storage client such as a host. Examples of such commands in at least one embodiment include the UNMAP command, the XCOPY (extended copy) command, and snapshot commands such as a create snapshot command. As noted above, such other commands can also be redirected from a non-owning node to an owning node of the corresponding volume or logical address(es).

In at least one embodiment, the UNMAP command can be used for storage reclamation. By issuing an UNMAP command, a host application or operating system specifies that a particular range of storage, such as for a particular LUN or logical device and an associated LBA range or subrange, is no longer in use by the host application or operating system and can be reclaimed. As a result, the specified storage range or region of the UNMAP command is reclaimed by the storage system and thus increases the free or available storage capacity of the storage system. The UNMAP command can be issued, for example, by a host operating system when the host or application deletes one or more files from a file system, and/or deletes one or more tables from a database. Files can be mapped to underlying storage regions of block storage on one or more LUNs. Thus, the deleted files can be mapped to a storage region that can now be unmapped and deallocated or reclaimed. More generally, the UNMAP command can be used to specify a storage region that is no longer in use, whereby the storage region can be reclaimed for reuse and added to the free or available storage capacity in the storage system. In at least one embodiment, if the UNMAP command is directed to unmapping a logical address range/subrange of a volume not owned by a node receiving the UNMAP command, the receiving node can redirect the UNMAP command to the owner peer node in a manner similar to that as discussed herein for reads and writes.

In at least one embodiment, the extended copy or XCOPY command is an offload copy operation performed internally within the data storage system. XCOPY performs a copy operation internal within the data storage system or appliance to copy data from a source to a target location, where the source (including the write data) and target (denoting the target location where the write data is copied to) are both in the same storage system or appliance. In at least one embodiment of an XCOPY command, reading content from a source volume can be performed by the node that owns the source volume, and writing the content to the target volume can be performed by the node that owns the target volume. In at least one embodiment, such orchestration of the foregoing reading and writing of content within a data storage system for an XCOPY command can be coordinated by the node receiving the XCOPY command such that the receiving node can, as needed, redirect reads and/or write requests to the peer node if the peer node owns, respectively, the source volume and/or target volume.

In at least one embodiment where per volume ownership is assigned such that each volume is owned by a single node, nodes can receive snapshot commands to create a snapshot of a volume. In at least one embodiment, creating a snapshot of a volume can include making copies of one or more MD pages of the mapping information associated with the volume, where such MD page copies are used with the snapshot. A snapshot can generally be characterized as a logical point in time copy of the volume such that at least initially the snapshot of the volume and the volume can both be associated with the same physical content or data. In at least one embodiment, a command to create a snapshot of a volume that is received by a non-owner node of the volume can be redirected to the owning node of the volume for processing to service the command in a manner similar to that as discussed herein for reads and writes. In this manner, the owner node can access or read the MD pages of the volume to create any needed MD page copies for the snapshot of the volume. The snapshot of the volume in at least one embodiment can also be owned by the same node that owns the volume such that all subsequent commands for the snapshot received by the non-owner node can also be redirected to the owner node for servicing.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
    receiving, at a first node of a storage system from a host, a read I/O directed to a first logical address;
    determining that the first node does not own the first logical address;
    responsive to determining that the first node does not own the first logical address, sending a redirect request from the first node to a second node of the storage system, wherein the second node owns the first logical address, wherein the redirect request is sent over an interconnect between the first node and the second node; and
    responsive to receiving the redirect request at the second node, the second node performing first processing including:
        determining, in accordance with one or more criteria, that the interconnect is overloaded;
        and
        responsive to determining, in accordance with the one or more criteria, that the interconnect is overloaded, sending a redirect reply over the interconnect from the second node to the first node where the redirect reply includes physical location information identifying a first physical storage location or address on non-volatile storage of first content of the first logical address.

2. The computer-implemented method of claim 1, further comprising:
    receiving, at the first node the redirect reply from the second node, where the redirect reply includes the physical location information of the first content;
    obtaining the first content from the first physical storage location on non-volatile storage, wherein the first physical storage location is identified by the physical location information of the redirect reply; and
    returning the first content obtained to the host in response to the read I/O.

3. The computer-implemented method of claim 1, further comprising:
    determining, in accordance with the one or more criteria, that the interconnect is not overloaded;
    responsive to determining, in accordance with the one or more criteria, that the interconnect is not overloaded, sending a second redirect reply over the interconnect from the second node to the first node where the second redirect reply includes the first content stored at the first logical address;
receiving, at the first node, the second redirect reply from the second node; and
returning the first content obtained from the second redirect reply to the host in response to a second read I/O.

4. The computer-implemented method of claim 1, wherein said first processing includes:
determining whether the first content of the first logical address is stored in a cache of the second node;
responsive to determining the first content is not stored in the cache of the second node, determining whether a mapping cache of the second node includes a corresponding descriptor of information about the first logical address; and
responsive to determining that the mapping cache does not include the corresponding descriptor of information about the first logical address, performing second processing comprising:
using mapping information including a plurality of metadata (MD) pages to map the first logical address to the first physical storage location on non-volatile storage where the first content is stored; and
obtaining the first content from the first physical storage location on non-volatile storage.

5. The computer-implemented method of claim 4, wherein the second processing includes:
promoting the first content to the cache of the second node wherein the first content is accessed in the cache using the first logical address; and
promoting the first physical storage location to the mapping cache of the second node, wherein said promoting the first physical storage location includes adding a descriptor to the mapping cache, wherein the first logical address is mapped to the descriptor, wherein the descriptor includes the physical location information identifying the first physical storage location on non-volatile storage.

6. The computer-implemented method of claim 5, wherein the redirect reply includes the physical location information obtained as a result of performing said second processing using said mapping information.

7. The computer-implemented method of claim 5, further comprising:
determining, in accordance with the one or more criteria, that the interconnect is not overloaded; and
responsive to determining, in accordance with the one or more criteria, that the interconnect is not overloaded, sending a second redirect reply over the interconnect from the second node to the first node where the second redirect reply includes the first content stored at the first logical address, wherein the second redirect reply includes the first content obtained as a result of performing the second processing using the mapping information.

8. The computer-implemented method of claim 1, wherein the one or more criteria includes a condition that specifies if a current utilization of the interconnect between the nodes is greater than a specified utilization threshold, other information including the physical location information of the first content is returned in the redirect reply rather than the first content, and otherwise the first content is allowed to be returned in the redirect reply.

9. The computer-implemented method of claim 1, wherein the one or more criteria includes a condition that specifies if current consumed bandwidth of the interconnect is greater than a specified threshold or percentage of a maximum supported or capable bandwidth of the interconnect, other information including the physical location information of the first content is returned in the redirect reply rather than the first content, and otherwise the first content is allowed to be returned in the redirect reply.

10. The computer-implemented method of claim 1, wherein the one or more criteria includes a condition that specifies if a total number of outstanding or pending I/O requests in the storage system exceeds a specified threshold, other information including the physical location information of the first content is returned in the redirect reply rather than the first content, and otherwise the first content is allowed to be returned in the redirect reply.

11. The computer-implemented method of claim 10, wherein the number of outstanding or pending I/O requests denote a total number of I/O requests that have been received at the storage system but for which a response or reply has not yet been returned to a host or other storage client.

12. The computer-implemented method of claim 1, wherein the one or more criteria includes a condition that specifies if a total number of outstanding or pending I/O redirection requests in the storage system exceeds a specified threshold, other information including the physical location information of the first content is returned in the redirect reply rather than the first content, and otherwise the first content is allowed to be returned in the redirect reply.

13. The computer-implemented method of claim 12, wherein the total number of outstanding or pending I/O redirection requests denotes a total number of redirection requests for which a non-owner node has sent a redirection request to an owner node but not yet received a reply.

14. The computer-implemented method of claim 1, wherein the one or more criteria includes a condition that specifies if an average I/O latency or I/O response time within the storage system exceeds a maximum threshold, other information including the physical location information of the first content is returned in the redirect reply rather than the first content, and otherwise the first content is allowed to be returned in the redirect reply.

15. The computer-implemented method of claim 1, wherein the one or more criteria includes a condition that specifies if an average redirection request latency or response time within the storage system exceeds a maximum threshold, other information including the physical location information of the first content is returned in the redirect reply rather than the first content, and otherwise the first content is allowed to be returned in the redirect reply.

16. The computer-implemented method of claim 15, wherein the average redirection latency or response time for a single redirection request denotes an amount of time it takes from a starting point to an ending point, wherein the starting point is a first point in time when the single redirection request is sent by a non-owner node to an owner node, and wherein the ending point denotes a second point in time when the non-owner node receives a corresponding redirection reply from the owner node.

17. The computer-implemented method of claim 1, wherein responsive to determining, in accordance with the one or more criteria, that the interconnect is overloaded, the redirect reply sent over the interconnect from the second node to the first node further includes a cryptographic hash value of the first content of the first logical address.

18. The computer-implemented method of claim 17, further comprising:

the second node reading the first content from the first physical storage location on non-volatile storage, wherein the first physical storage location is determined by the second node using the physical location information of the redirect reply; and the second node using the cryptographic hash value of the redirect reply perform data validation of the first content read from the first physical storage location, wherein performing said data validation of the first content includes:

determining a second cryptographic hash value using the first content read from the physical storage location;

determining whether the cryptographic hash value matches the second cryptographic hash value; and responsive to determining that the cryptographic hash value matches the second cryptographic hash value, determining that the first content, as read from the physical storage location in accordance with the physical storage information of the redirect reply, is valid.

19. A system comprising:
one or more processors; and
a memory comprising code stored thereon that, when executed, performs a method comprising:
receiving, at a first node of a storage system from a host, a read I/O directed to a first logical address;
determining that the first node does not own the first logical address;
responsive to determining that the first node does not own the first logical address, sending a redirect request from the first node to a second node of the storage system, wherein the second node owns the first logical address, wherein the redirect request is sent over an interconnect between the first node and the second node; and
responsive to receiving the redirect request at the second node, the second node performing first processing including:
determining, in accordance with one or more criteria, whether the interconnect is overloaded;
responsive to determining, in accordance with the one or more criteria, that the interconnect is not overloaded, sending a redirect reply over the interconnect from the second node to the first node where the redirect reply includes first content stored at the first logical address; and
responsive to determining, in accordance with the one or more criteria, that the interconnect is overloaded, sending the redirect reply over the interconnect from the second node to the first node where the redirect reply includes physical location information identifying a first physical storage location or address on non-volatile storage of the first content of the first logical address.

20. A non-transitory computer readable medium comprising code stored thereon that, when executed, performs a method comprising:
receiving, at a first node of a storage system from a host, a read I/O directed to a first logical address;
determining that the first node does not own the first logical address;
responsive to determining that the first node does not own the first logical address, sending a redirect request from the first node to a second node of the storage system, wherein the second node owns the first logical address, wherein the redirect request is sent over an interconnect between the first node and the second node; and
responsive to receiving the redirect request at the second node, the second node performing first processing including:
determining, in accordance with one or more criteria, whether the interconnect is overloaded;
responsive to determining, in accordance with the one or more criteria, that the interconnect is not overloaded, sending a redirect reply over the interconnect from the second node to the first node where the redirect reply includes first content stored at the first logical address; and
responsive to determining, in accordance with the one or more criteria, that the interconnect is overloaded, sending the redirect reply over the interconnect from the second node to the first node where the redirect reply includes physical location information identifying a first physical storage location or address on non-volatile storage of the first content of the first logical address.

* * * * *